(12) United States Patent
Ramu et al.

(10) Patent No.: US 7,412,339 B2
(45) Date of Patent: Aug. 12, 2008

(54) METHOD AND APPARATUS FOR IDENTIFYING AN OPERATIONAL PHASE OF A MOTOR PHASE WINDING AND CONTROLLING ENERGIZATION OF THE PHASE WINDING

(75) Inventors: Krishnan Ramu, Blacksburg, VA (US); Ajit Bhanot, New Delhi (IN)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 10/999,646

(22) Filed: Nov. 24, 2004

(65) Prior Publication Data

US 2005/0154545 A1    Jul. 14, 2005

Related U.S. Application Data

(63) Continuation of application No. PCT/US03/16627, filed on May 27, 2003.

(60) Provisional application No. 60/382,608, filed on May 24, 2002, provisional application No. 60/382,609, filed on May 24, 2002, provisional application No. 60/382,610, filed on May 24, 2002.

(51) Int. Cl.
  *H02P 1/00* (2006.01)
  *H02P 3/00* (2006.01)

(52) U.S. Cl. .......................... 702/65; 318/484

(58) Field of Classification Search ................. 702/41, 702/64–65, 79, 150, 176–177, 189; 318/700–701, 318/712–718, 727, 254, 437, 445, 484; 388/857–858, 388/921
See application file for complete search history.

(56) References Cited

U.S. PATENT DOCUMENTS

| | | | | | |
|---|---|---|---|---|---|
| 4,085,355 | A | * | 4/1978 | Fradella | 318/703 |
| 4,520,300 | A | * | 5/1985 | Fradella | 318/603 |
| 5,053,686 | A | * | 10/1991 | Juarez | 318/254 |
| 5,355,705 | A | * | 10/1994 | Schulze et al. | 72/83 |
| 5,642,044 | A | * | 6/1997 | Weber | 324/207.25 |
| 5,783,916 | A | * | 7/1998 | Blackburn | 318/254 |
| 5,969,499 | A | * | 10/1999 | Shaffer | 318/801 |
| 6,344,721 | B2 | * | 2/2002 | Seki et al. | 318/254 |
| 6,563,286 | B2 | * | 5/2003 | Seki et al. | 318/727 |
| 6,639,370 | B1 | * | 10/2003 | Gabrys | 318/161 |

OTHER PUBLICATIONS

Brynielsson, "Method and Device in Vehicle Control System, and System for Error Diagnostics in Vehicle", Aug. 17, 2000, IPN WO 00/47885.*

* cited by examiner

*Primary Examiner*—Hal D Wachsman
*Assistant Examiner*—Mary C Baran
(74) *Attorney, Agent, or Firm*—Dickinson Wright, PLLC

(57) ABSTRACT

A method for identifying an operational phase of a motor may include obtaining a first value of a signal that is indicative of the operational phase of the motor and obtaining a second value of the signal after a period of time has expired. The method further includes identifying a first operational phase of the motor if the second value exceeds the first value by a non-negative first threshold value. A second operational phase of the motor is identified if the second value does not exceed the first value by the first threshold value. The first and second operational phases may correspond to relative positions of a motor's rotor and stator, such that periods of energization may be identified for producing motoring or regenerative torque.

14 Claims, 14 Drawing Sheets

METHOD AND APPARATUS FOR IDENTIFYING AN OPERATIONAL PHASE OF A MOTOR PHASE WINDING AND CONTROLLING ENERGIZATION OF THE PHASE WINDING

CROSS-REFERENCE TO RELATED APPLICATIONS

This is a continuation of PCT International application serial number PCT/US03/16627 filed May 27, 2003, which is based on provisional application Ser. Nos. 60/382,608, 60/382,609 and 60/382,610 all filed on May 24, 2002.

BACKGROUND OF THE INVENTION

1. Field of the Invention

The invention relates to a method and apparatus for identifying an operational phase of a motor phase winding and controlling energization of the phase winding.

2. Description of Related Art

The control of a switched reluctance machine (SRM) is highly dependent on the absolute position of its rotor. A detailed description of this relational dependency is provided in "Switched Reluctance Motor Drives," R. Krishnan, CRC Press, June 2001. The position of the rotor can be measured using an encoder, a resolver, or optical switches with magnet wheels. A solution by any of the above means is expensive and, therefore, not applicable and desirable in low performance, high volume, and low-cost applications.

Another way to obtain the absolute rotor position is by way of estimating it indirectly through measurement and processing of current or voltage signals. The basis for such a method lies in the fact that a phase winding of the SRM has a distinct and unique three-dimensional relationship among its three key variables of inductance/flux linkages, excitation phase current, and rotor position. When values of two of the three variables are known, the third variable can be deduced from prior knowledge of the three-dimensional relationship. Currents can be measured easily and inexpensively and flux linkages can be computed (provided the voltages of the windings are available), thus making the rotor position extraction an easy and simple matter.

Voltage measurements are not always inexpensive, clean, and free of switching noise. Thus, implementing a method of measuring voltage values to derive the third variable often presents a challenge in practice. Also, the way in which the method is implemented determines the estimation accuracy, the motor drive's speed range, implementation cost, and the robustness of the implementation. A method to inexpensively sense, measure, or estimate the absolute rotor position, directly or indirectly, remains a significant research and development challenge.

In "Switched Reluctance Motor Drives," Krishnan categorizes various methods of rotor position estimation and identifies their respective algorithms, implementations, merits, and demerits. Some related art methods are described below.

Watkins discloses in U.S. Pat. No. 5,793,179 using a freewheeling current to estimate rotor position. The relationship between the flux-linkage and the current in an SRM can be expressed as:

$$\lambda = i \cdot L \ldots$$
$$\frac{d\lambda}{d\theta} = i \cdot \frac{dL}{d\theta} + L \cdot \frac{di}{d\theta} \ldots$$
$$\frac{di}{d\theta} = \frac{1}{L}\left[\frac{d\lambda}{d\theta} - i \cdot \frac{dL}{d\theta}\right] \ldots$$

where i is the current, L is the inductance, $\lambda$ is the flux linkage of a stator phase, and $\theta$ is the rotor position.

During freewheeling, the right-hand side of the second equation can be simplified, since the voltage across the phase winding will be low and, therefore, the rate of change of flux is negligible. This gives rise to the relationship:

$$\frac{di}{d\theta} = \frac{1}{L}\left[-i \cdot \frac{dL}{d\theta}\right] \ldots$$

For a small $\Delta i \approx \alpha[-i\Delta L]$, where $\alpha = (1/L)$ . . . .

Watkins' method uses the fact that at the fully aligned position, of a set of rotor poles with respect to a set of stator poles, the rate of change of inductance with angle is essentially zero, irrespective of the level of phase current. Thus, according to the equation above, if $\Delta i=0$, the rotor position is centered on the aligned position, where the rate of change of inductance is zero. If $\Delta i \neq 0$, then its sign will give an indication of the operating point of the SRM, indicating whether the SRM is operating in a positive or negative inductance slope region.

The advantage of Watkins' method is that it is fairly simple to deploy. The disadvantage of the method being that it requires the machine to be rotating, with current in at least one phase winding. Therefore, it requires a separate startup procedure and device.

Liu et al. disclose in U.S. Pat. No. 6,107,772 using the rise time of currents to detect rotor position. This method is based on the principle that current rise times in a motor phase coil are directly proportional to the inductance in the phase coil. The inductance in the phase coil is indicative of the rotor position and, hence, the rise times give an indication of the rotor position. The rise time is compared to a desired current rise time, which is indicative of an in-phase relationship between the conduction interval and rotor position. Therefore, the rise time can be used to generate control signals that govern commutation instances.

MacMinn et al. disclose in U.S. Pat. No. 4,642,543 an SRM drive system that includes a state sequencing mechanism that is coupled to a phase sequencer to achieve position-based operation of a motor, without using a position sensor. A current sensor provides the state sequencing mechanism with the average current going through the motor windings, and the state sequencer generates the starting sequences based on the current information. The phase sequencer determines the phase to be energized, based on information received from the state sequencing mechanism. The start-up state sequence may be modeled by a state diagram having an align state, a start state, a check state, and a ramp state. From the align state, a transition is made to the start state, where an attempt to start the motor is made. Thereafter, a transition to the check state is effected and a determination of the average direct current (dc), $I_{dc}$, in the motor windings is made. If $I_{dc}$ rises above a reference value, $I_{ref}$, the start-up state sequence is reset to the align state, indicating the start-up sequence has to be re-tried. If $I_{dc}$ is less than $I_{ref}$, the start-up sequence proceeds to the ramp state, which means that the start-up sequence is successful. Thereafter, the phase sequencer takes the motor to the commanded speed.

Konecny discloses in U.S. Pat. No. 5,015,939 a motor control circuit for an SRM that includes a rotor and a plurality of stator coils. A driver circuit for energizing the stator coils in sequence includes a current sensing resistor, for detecting a signal proportional to the current in the coils, and a slope detector for detecting the rate of change of the current signal with respect to time, over predetermined time intervals during which the voltage in the coils is dominated by a term representing back EMF. A variable oscillator is responsive to an integrated output of the slope detector for generating a timing signal for the driver circuit. When the voltage across the coils is dominated by the back EMF term, the current should be substantially constant. But when the rotor is out of phase with the driver circuit, the current signal during this time has a substantially linear slope, which is either positive or negative depending upon whether the rotor is leading or lagging the driver circuit.

Another method that uses active phase current sensing has been proposed by Sood et al. in U.S. Pat. No. 5,420,492 and Marcinkiewicz et al. in U.S. Pat. No. 5,457,375. This method uses the dc bus current waveform to gather information regarding commutation instants for the motor. The method uses a processor to evaluate the slope and amplitude of the dc bus current, compares this waveform to a desired waveform, and then adjusts the commutation frequency accordingly. Prior knowledge of the waveform is required and has to be stored in memory for the method to work. Marcinkiewicz improves upon Sood's method by introducing an algorithm that takes into account the ripple content.

MacMinn et. al. disclose in U.S. Pat. No. 4,959,596 using an inductance sensing method, where voltage sensing pulses are applied to an inactive phase. The change in phase current resulting from the sensing pulses is inversely proportional to the instantaneous value of the phase inductance. A proper commutation time is determined by comparing this change in phase current to a threshold current, thus synchronizing phase excitation to the rotor position. Phase excitation is advanced or retarded by decreasing or increasing the threshold, respectively.

External signal injection into an inactive phase is used by Green, in U.S. Pat. No. 6,291,949, to achieve sensorless operation of a polyphase SRM. In the chopping mode, diagnostic pulses of predetermined flux linkage are injected into an idle phase. In the single-pulse mode, position prediction is performed using an active phase. A method of starting the machine uses diagnostic pulses in two phases to provide a unique value for position, allowing the drive to start or re-start under full torque. In another variation of this method, Green discloses in U.S. Pat. No. 6,351,094 injecting voltage pulses into an idle period of each phase winding in a chopping mode. Both of these methods are suitable for polyphase machines. An attempt is made to reduce acoustic noise by varying the frequency at which the pulses are injected according to the rotor speed.

Mayes discloses in U.S. Pat. No. 6,396,237 using a method based on injecting a diagnostic pulse, having a predetermined maximum value of current or flux linkage, into an inactive phase winding. The current or the flux linkage is measured at the end of the pulse and at the start before the pulse is injected. A value for the current or flux-linkage, due to injection of the diagnostic pulse, from the difference between the total current and the main current or flux-linkage is determined and then used to infer the rotor position.

MacMinn discloses in U.S. Pat. No. 4,772,839 an indirect position sensor that applies short duration low-level sensing pulses to two un-energized phases. A change in the phase is sensed to produce two values of estimated position values, for each of the un-energized phases. One of the two values corresponding to each un-energized phase is shifted by a value, which is equal to the phase displacement between the two un-energized phases. The two values corresponding to each un-energized phase are used to give an estimate of a rotor position. If one of the initially inactive phase becomes energized, then an extrapolation algorithm is used to estimate the angle, until there are two un-energized phases available to use the above estimation technique. This technique is only usable for polyphase machines.

Lyons et al. disclose in U.S. Pat. No. 5,525,886 a method of estimating rotor position by applying relatively high frequency, short duration, probe pulses to at least two inactive phases. The voltage and the currents in these phases are measured and used to compute an estimate of the rotor and stator flux linkage in each of the phases. This estimate is fed into a model to determine the rotor position. The model can be a simple look-up table that has the rotor position corresponding to the potential flux values. The disadvantage of the method is that a look-up table has to be in place for this method to work. Also, measuring the voltages requires an expensive transducer part, which is unacceptable in many applications.

Kalpathi discloses in U.S. Pat. No. 5,786,681 using active phase coil inductance sensing to determine when to switch conduction to the next phase. The circuit has an asymmetric converter bridge and two switches per phase and operates as follows. First, both switches are turned on to initiate the conduction phase. Then, the bottom switch is kept closed while the top switch is switched on and off to produce local maximum and minimum currents. The amounts of time taken to reach each pair of local maxima and minima are recorded and their ratio is compared to a predetermined ratio to determine the commutation signal.

Ray discloses in U.S. Pat. No. 5,467,025 measuring the current and flux in an active phase, at a predicted rotor position value, and comparing the measured values to reference values. The angular error between the compared values identifies the predicted rotor position for the next cycle. The advantage of this method is that it requires the flux and the current only once every conducting cycle, unlike other flux linkage methods that compare the flux to a reference value continuously to determine the commutation time. But the disadvantage of this method is that it requires flux linkages, which in turn require both voltage and current sensing, making it difficult to implement compactly and with low cost.

A current gradient technique uses the fact that if the pulse width modulation (PWM) duty cycle is kept constant during one conduction period of a phase, then the slope of the current with respect to rotor position increases initially. When the inductance starts to rise, the current-slope decreases. Gabriel et al. disclose such a technique in IEEE Transactions on Industry Applications, Vol. 34, No. 4, pp. 832-834, July/August 1998. The limitations of this method are (1) the machine phases are triggered with an advance angle and (2) a separate starting mechanism needs to be in place to have full range of operation. The advantage of the method is that complex circuitry is not required to determine rotor position.

Holling et al. and Lim disclose in U.S. Pat. Nos. 5,600,218 and 5,589,751, respectively, using the current gradient technique. Their algorithms compare a differentiated, normalized, current waveform to a predetermined threshold. The result of the comparison can then be used to detect the commutation point.

Holling discloses using the algorithm for a brushless dc motor, though this use may be extended to a variable reluctance motor.

Another technique known in the related art is a flux linkage based method that provides hesitation free starting. A common drawback of position sensorless techniques is the hesitation that occurs while starting the SRM.

Bu and Xu disclose in "Eliminating Starting Hesitation for Reliable Sensorless Control of Switched Reluctance Motors," Conference Record, IEEE Industry Applications Society, pp. 693-700, October 1998, a method for self starting without hesitation. All phases are excited for a short period and phase currents are measured. The phase with the second highest current is chosen to identify the rotor position. The drawback with this method is that a voltage transducer is needed in addition to current sensors.

Observer based estimation methods use model reference adaptive control (MRAC) techniques, simple observer/estimation techniques or a full observer technique. Lumsdaine and Lang disclose simple observer/estimation techniques in "State Observers for Variable-Reluctance Motors," IEEE Transactions on Industrial Electronics, Vol. 37., No. 2, 1990, pp. 133-142. Gentili and Nicosia disclose a full observer technique in "Observer Based Control System Design for Switched Reluctance Motors," Proceedings of the 34th Conference on Decision and Control, December 1995, pp. 115-120. Elmas and Zelaya-De La Parra also disclose a full observer technique in "Application of a Full Order Extended Luenberger Observer for a Position Sensorless Operation of a Switched Reluctance Motor Drive," IEEE Proceedings on Control Theory Applications, Vol. 143, No. 5, 1996, pp. 401-408.

These methods are all computationally intensive and, hence, are not viable industrial solutions for high volume commercial applications. Also, most of the current research is incomplete. Furthermore, the issue of self-starting has not been addressed in any of the studies. These methods are also discussed in "Switched Reluctance Motor Drives," R. Krishnan, CRC Press, June 2001.

Lyons et al. disclose in U.S. Pat. No. 5,097,190 a model based approach. This approach uses a multi-phase lumped parameter model of an SRM. The method uses a sensor to sense flux. The measured flux is used to look up a corresponding position in a ROM or a microprocessor look-up table. The drawback of this method, apart from its complexity, is that it utilizes a microprocessor or look-up table. Also, this method is not suitable at very high speeds, as the look-up table and the capability of the analog-to-digital converter limits its operation.

A more involved model has been developed by the present inventors where the flux linkages of all phases are measured, to indirectly determine the rotor position. In this application, the motor is modeled as a network driven by a magnetomotive force. The flux generated in the stator poles is determined, and from the phase current and flux measurements, the reluctance of each phase is determined. The phase reluctance provides an indication of the rotor position with respect to the aligned position. The model takes into account the multi-phase saturation, leakage, and mutual coupling effects. The disadvantage of this method is the expense incurred in measurement of flux.

Branecky discloses in U.S. Pat. No. 6,153,956 a method using the same principle of flux level control along with a look-up table. The difference lies in the fact that Branecky uses a switch to account for various waveforms of currents, namely flat current waveforms or other waveforms. This relationship is also reflected in the look-up table on the microprocessor side. The key disadvantage is in identifying the nature of current waveforms. Also, limiting set of waveforms to make the implementation easier may compromise accuracy of the rotor position estimation.

Hedlund et al. disclose in U.S. Pat. No. 5,173,650 determining the actual flux value and comparing this flux value with a reference flux value, which is a predetermined non-linear function of current. The premise of the invention lies in the fact that for each angular position, there is a nonlinear relationship between magnetic flux and current in the windings of the stator pole pairs. The predetermined value of the flux corresponds to the angle at which the commutation between phases is desired. When the actual value exceeds or equals the reference value of the flux, commutation occurs. As with all the flux or flux linkage-based implementations, the flux or flux linkage estimation requires voltage sensing, which increases the sensing burden and thereby increases the complexity of the implementation.

Heglund discloses in U.S. Pat. No. 6,359,412 utilizing a relative angle estimation circuit, an angle combination circuit, and an estimator that includes a Kalman filter. Phase currents are measured in the relative angle estimator. The angle combination circuit combines the estimates to obtain an absolute angle, which eliminates ambiguities. The estimator uses the model of an SRM to further increase the accuracy of the estimated rotor position and velocity. This method uses modern control theory and complex circuitry that prohibits its use in high volume applications.

Morris discloses in U.S. Pat. No. 6,150,778 a method for sensorless operation of an SRM having at least one irregular pole. The irregularity may be provided by its geometric shape, material properties, or any other characteristic that can give rise to an irregular inductance profile. Voltage is sensed across one phase winding and compared to a reference voltage to generate an encoder output that is indicative of the rotor position. The encoder signal is then used to control the excitation of the phase.

In another variation of this method, the voltage across a pair of windings is measured. Due to the irregular shape of the rotor, the voltages across these two sets of windings, of the same phase, follow a set pattern and can be used for rotor position detection. To determine actual rotor position, an analog voltage ratio is determined. By mapping the voltage ratio versus rotor position (for one or more phases), the actual rotor position is looked up from a look-up table of rotor position data, using the computed voltage ratio. Since the method uses ratiometric data, the position information supplied is insensitive to supply voltage, winding temperature, nominal inductance, and other operating conditions. The advantages of this method are (1) it doesn't require conventional sensors, (2) it is insensitive to the supply voltage differences, in inductance, due to the manufacturing variations, and (3) it is low cost, easier to implement, and can be used in harsh environments. The disadvantage is that in case of ambiguous position information, information has to be present for more than one phase to remove the ambiguity. Also, this method requires a separate start-up procedure and is unsuitable for high speed operation.

MacCann discloses in U.S. Pat. Nos. 5,691,591 and 5,949,211 using auxiliary windings interspersed with the main winding. The controller is capable of individually energizing the main as well as the auxiliary windings, individually. A voltage sensor determines the voltage across an auxiliary winding when it is energized. The phase of the current in the auxiliary is measured and the difference between the two phases is used to provide a signal that is indicative of the position of the rotor.

Bartos et al. disclose in U.S. Pat. No. 5,256,923 a method that uses irregularities in either a rotor or stator pole. The algorithm revolves around the fact that one or more irregularities in either the stator or rotor poles, or both, create a distinct pattern in an otherwise standard inductance profile. The unique shape of the rotor causes a disturbance in the normal inductance profile. The frequency at which the disturbances occur in the inductance profile can be used to get speed information as well.

All reference material cited herein is hereby incorporated into this disclosure by reference.

SUMMARY OF THE INVENTION

An object of the present invention is to overcome the shortcomings and problems encountered in related art devices. The present invention provides a means for indirectly estimating the absolute rotor position of a switched reluctance machine (SRM). No sensors are required in the machine other than the current sensors to measure the current in the machine windings. The current sensors can be inexpensive and can be resistor based. Moreover, these sensors need not be isolated when used with power converter topologies that have been disclosed in the co-pending patent applications, cited herein.

The objects of the present invention may be achieved in whole or in part by a method for identifying an operational phase of a motor including obtaining a first value of a signal that is indicative of the operational phase of the motor and obtaining a second value of the signal after a period of time has expired. The method further includes identifying a first operational phase of the motor, if the second value exceeds the first value by a non-negative first threshold value. A second operational phase of the motor is identified if the second value does not exceed the first value by the first threshold value.

The objects of the present invention may be further achieved in whole or in part by a method for identifying an operational phase of a motor including obtaining a first value of a signal that is indicative of the operational phase of the motor and obtaining a second value of the signal after a first time period has expired. A third value of the signal is obtained after a second time period has expired, and a fourth value of the signal is obtained after a third time period has expired. The method further includes identifying a first operational phase of the motor if: (1) the third value exceeds the first value by a non-negative first threshold value and (2) the fourth value exceeds the second value by a non-negative second threshold value. A second operational phase of the motor is identified if the first operational phase is not identified.

The objects of the present invention may be further achieved in whole or in part by a method for identifying an operational phase of a motor including obtaining a first measure of time a phase winding of the motor is being energized and obtaining a second measure of time the phase winding of the motor is being energized, during a subsequent energization period. A first operational phase of the motor is identified if the second measure exceeds the first measure by a non-negative first threshold value. A second operational phase of the motor is identified if the second measure does not exceed the first measure by the first threshold value.

The objects of the present invention may be further achieved in whole or in part by a controller, for controlling energization of a phase winding of a motor, that includes a first sample and hold device that obtains a first value of a signal, which is indicative of an operational phase of the motor, and a second sample and hold device that obtains a second value of the signal, after a period of time has expired. A first comparator compares the first and second values. A switching logic device identifies a first operational phase of the motor if the second value exceeds the first value by a non-negative first threshold value and identifies a second operational phase of the motor if the second value does not exceed the first value by the first threshold value.

The objects of the present invention may be further achieved in whole or in part by a controller, for controlling energization of a phase winding of a motor, that includes a hysteresis controller that produces a gating signal, based on a difference between a signal indicative of a current flowing through the phase winding of the motor and a reference signal. The controller also includes a timing device that produces sequential timer signals, each of which is indicative of an amount of time the gating signal remains at a particular signal state, where each particular signal state corresponds is the same. A switching logic device identifies a first operational phase of the motor, if a subsequent timer signal of the sequence has a value exceeding that of a prior timer signal of the sequence by a first threshold value, and identifies a second operational phase of the motor if the prior timer signal value exceeds the subsequent timer signal value by a second threshold value.

BRIEF DESCRIPTION OF THE DRAWINGS

Preferred embodiments of the present invention will now be further described in the following paragraphs of the specification and may be better understood when read in conjunction with the attached drawings, in which.

DETAILED DESCRIPTION OF THE INVENTION

Figure 1:
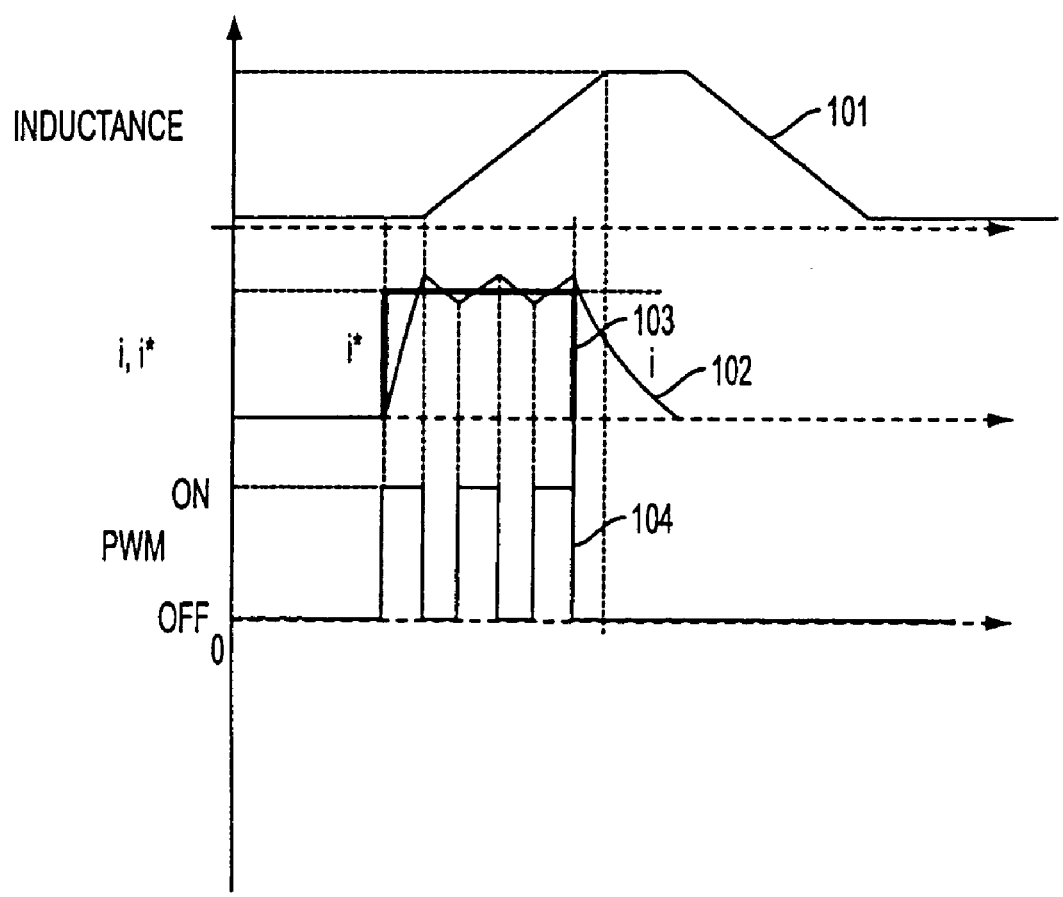
FIG. 1 illustrates a relationship between the inductance of a phase winding and a rotor position of a motor with respect to its stator.

FIG. 1 illustrates a relationship between the inductance of a phase winding and a rotor position of a motor with respect to its stator. An inductance characteristic 101 of the phase winding is shown in relation the rotor position in a switched reluctance machine (SRM), for a given current excitation 102. Assume that inductance 101 is only a function of the rotor position and not dependent on current excitation 102, which is only true in a linear range of the SRM's B-H characteristics.

For the SRM's phase winding to produce motoring power, it is essential that current excitation 102 be present in the region where the inductance is monotonically rising, that is, where its slope with respect to the rotor position is positive. Note that there are two regions where the inductance is constant, one at a lowest value known to correspond to an unaligned position of rotor and stator poles (usually denoted as unaligned position) and the other at a highest value known to correspond to the aligned rotor and stator poles position, usually denoted as an aligned position. A current reference or current command 103 and actual current excitation 102 are shown in FIG. 1, with current command 103 in block lines and actual current excitation 102, shown in thin trace lines, trying to follow it. A pulse width modulation (PWM) circuit generates turn-on and turn-off signals 104 to the power converter switches for that phase. These pulse signals 104 have varying duty cycles.

A simple controller only requires instants of current turn on and current turn off. These instants occur when the phase winding has to be kept energized, that is, when the inductance is rising, say for motoring. This invention provides an apparatus and method for finding the intervals during which a stator phase has to be energized and de-energized. Similar reasoning can be applied for regeneration operation and, likewise, for operation in the other direction of rotation also. Moreover, knowing the phase conduction periods is useful in generating the encoder pulses to compute the speed, from which an elementary speed feedback control is exercised resulting in desired speed control of the machine.

The present invention estimates indirectly the conduction and non-conduction intervals of current excitation 102 in each SRM phase, which then can be correlated to absolute rotor position, if need be. These intervals are estimated by only looking at the duty cycle of the pulse width modulator output or the input of the pulse width modulator, termed a control voltage (CV). The control voltage is directly proportional to the duty cycle and is usually converted to a pulse width modulated signal output. The scientific basis for the invention is derived as follows.

Consider the region of interest in the current control as where the current and its command are very near to each other in magnitude. The region of interest excludes an initial period region where the current rises to meet the command, assuming it is a step command. Additionally, the region of interest excludes a final period region where the current in the phase is being turned off or commutated with a zero applied or negative applied voltage across the machine phase. The period in between the initial and final periods corresponds to the region of interest, where the current is very close in value to the reference may be a quasi-steady state for the system. Only that period is of interest from now on, for us, to the estimation of the operating inductance region of the SRM. Consider one phase voltage equation of the SRM expressed as:

$$v = Ri + L\frac{di}{dt} + i\omega\frac{dL}{d\theta},$$

where v is the applied voltage, R is the stator winding resistance per phase, L is the inductance at that time and for that current, ω is the rotor speed, θ is the rotor position, and i is the current. The term dL/dθ can be considered a constant for a carrier period and is inversely proportional to the carrier frequency. Since the carrier frequency is in the range of 20 kHz, the carrier period is around 50 μs. It is a small time over which the inductance and its slope may be considered to remain constant.

During the carrier period, an ON pulse is applied to the controllable switch, thereby causing the switch to apply a dc link voltage to the machine winding for a duration equivalent to the multiplication product of the duty cycle and the carrier period, given by dT. Then for time, T−dT, zero or negative bus voltage is applied, depending on the control strategy and converter topology selected for the SRM drive system. During the carrier period, the current rises from its low value to a peak value in time dT and then declines from its peak to its low value in time T−dT. If the current variation is 2ΔI one way, in dT seconds, and assuming −2ΔI the other way, in T−dT seconds, then the average current can be approximated by $I_0 + \Delta I$, where $I_0$ is the minimum value of current or initial current in the carrier period.

Then for the duration of the on time of the carrier periods of two successive PWM cycles, the voltage equation can be integrated and its average is obtained as:

$$d_1 V = R(I_0 + \Delta I) + L_1 \frac{2\Delta I}{d_1 T} + (I_0 + \Delta I)\omega \frac{dL}{d\theta} \quad (1)$$
$$d_2 V = R(I_0 + \Delta I) + L_2 \frac{2\Delta I}{d_2 T} + (I_0 + \Delta I)\omega \frac{dL}{d\theta}$$

from which, $$d_2 V = d_1 V + \frac{2\Delta I}{T}\left(\frac{L_2}{d_2} - \frac{L_1}{d_1}\right) \quad (2)$$

leads to, $$d_2 - d_1 = \frac{2\Delta I}{VT}\left(\frac{L_2}{d_2} - \frac{L_1}{d_1}\right) \quad (3)$$

where $d_2$ and $d_1$ are duty cycles of two succeeding PWM cycles and $L_2$ and $L_1$ are the machine inductances for respective duty cycles.

Or a little more rigorously, the machine equations and their manipulation can be presented as follows. During the phase switch on time or phase conduction period, $$V_a = V_{dc} = R_s i + L\frac{di}{dt} + i\omega_m \frac{dL}{d\theta}, \quad 0 < t < dT. \quad (4)$$

During the time when the phase switch is turned off, $$V_a = 0 = R_s i + L\frac{di}{dt} + i\omega_m \frac{dL}{d\theta}, \quad dT < t < T. \quad (5)$$

Averaging the first equation, $$d_1 V_{dc} = d_1 V \qquad (6)$$
$$= R_s(I_{min} + \Delta I) + L_1\left(\frac{2\Delta I}{d_1 T}\right) +$$
$$L_1\left(\frac{-2\Delta I}{1-d_1 T}\right) + (I_{min} + \Delta I)\omega_m \frac{dL}{d\theta}$$

and, letting $I_{min} + \Delta I = I_{av}$, (7)

$$d_1 V = R_s I_{av} + \frac{L_1 2\Delta I}{T}\left[\frac{1-2d_1}{d_1(1-d_1)}\right] + I_{av}\omega_m \frac{dL}{d\theta}. \qquad (8)$$

Likewise, $$d_2 V = R_s I_{av} + \frac{L_2 2\Delta I}{T}\left[\frac{1-2d_2}{d_2(1-d_2)}\right] + I_{av}\omega_m \frac{dL}{d\theta} \qquad (9)$$

$$(d_2 - d_1)V = \frac{2\Delta I}{T}\left[\frac{L_2(1-2d_2)}{d_2(1-d_2)} - \frac{L_1(1-2d_1)}{d_1(1-d_1)}\right] \qquad (10)$$

$$(d_2 - d_1) = \frac{2\Delta I}{VT}\left[\frac{L_2(1-2d_2)}{d_2(1-d_2)} - \frac{L_1(1-2d_1)}{d_1(1-d_1)}\right] \qquad (11)$$

Case 1:
If $d_2 > d_1$, then $$\frac{L_2(1-2d_2)}{d_2(1-d_2)} > \frac{L_1(1-2d_1)}{d_1(1-d_1)} \qquad (12)$$

$$L_2 > L_1\left\{\frac{d_2(1-2d_1)}{d_1(1-d_2)}\frac{(1-d_2)}{(1-d_1)}\right\} \qquad (13)$$

Let, $d_2 = d_1 + \Delta d$, then (14)

$$L_2 > L_1\left\{\frac{(1-2d_1)}{(1-2d_1-2\Delta d)}\right\}\left\{1+\frac{\Delta d}{d_1}\right\}\left\{1-\frac{\Delta d}{(1-d_1)}\right\} \qquad (15)$$

$$L_2 > L_1\left\{\frac{1}{\left(1-\frac{2\Delta d}{(1-2d_1)}\right)}\right\}\left\{1+\frac{\Delta d}{d_1}\right\}\left\{1-\frac{\Delta d}{(1-d_1)}\right\} \qquad (16)$$

which can also be written as $$L_2 > L_1\left(1+\frac{2\Delta d}{1-2d_1}\right)\left\{1+\frac{\Delta d}{d_1}\right\}\left\{1-\frac{\Delta d}{(1-d_1)}\right\}. \qquad (17)$$

Case (i):
If $d_2 > d_1$,
Then $L_2 > L_1$.

Case (ii):
If $d_2 < d_1$,
Then $L_2 < L_1$.

Case (iii):
If $d_2 = d_1$,
Then $L_2 = L_1$.

These results can be proved for various cases that have been considered. For the sake of brevity, the proof is skipped here.

Equation (17) has the following implications, by coordinating the understanding with the inductance versus rotor position versus current characteristics of the machine:

(1) If $d_2 > d_1$, then $L_2 > L_1$, indicating the machine is in a motoring region.

(2) If $d_2 = d_1$, then $L_2 = L_1$, indicating that the machine is in a no torque region, i.e., it may be in the aligned or unaligned position.

(3) If $d_2 < d_1$, then $L_2 < L_1$, indicating the machine is in the regenerative region.

As shown above, the duty cycle becomes a clear indicator of where the rotor position is in absolute terms, with regard a region of operation. These regions of operation are the motoring, zero torque, and regenerative regions. Though the duty cycle doesn't identify where the rotor is exactly, this determination can be made by coordinating the measurements over a rotor pole pitch. For many applications, though, it is sufficient to know when to energize each phase and when to commutate it. The algorithm that generates this crucial information is derived and demonstrated in the above description.

Figure 2:
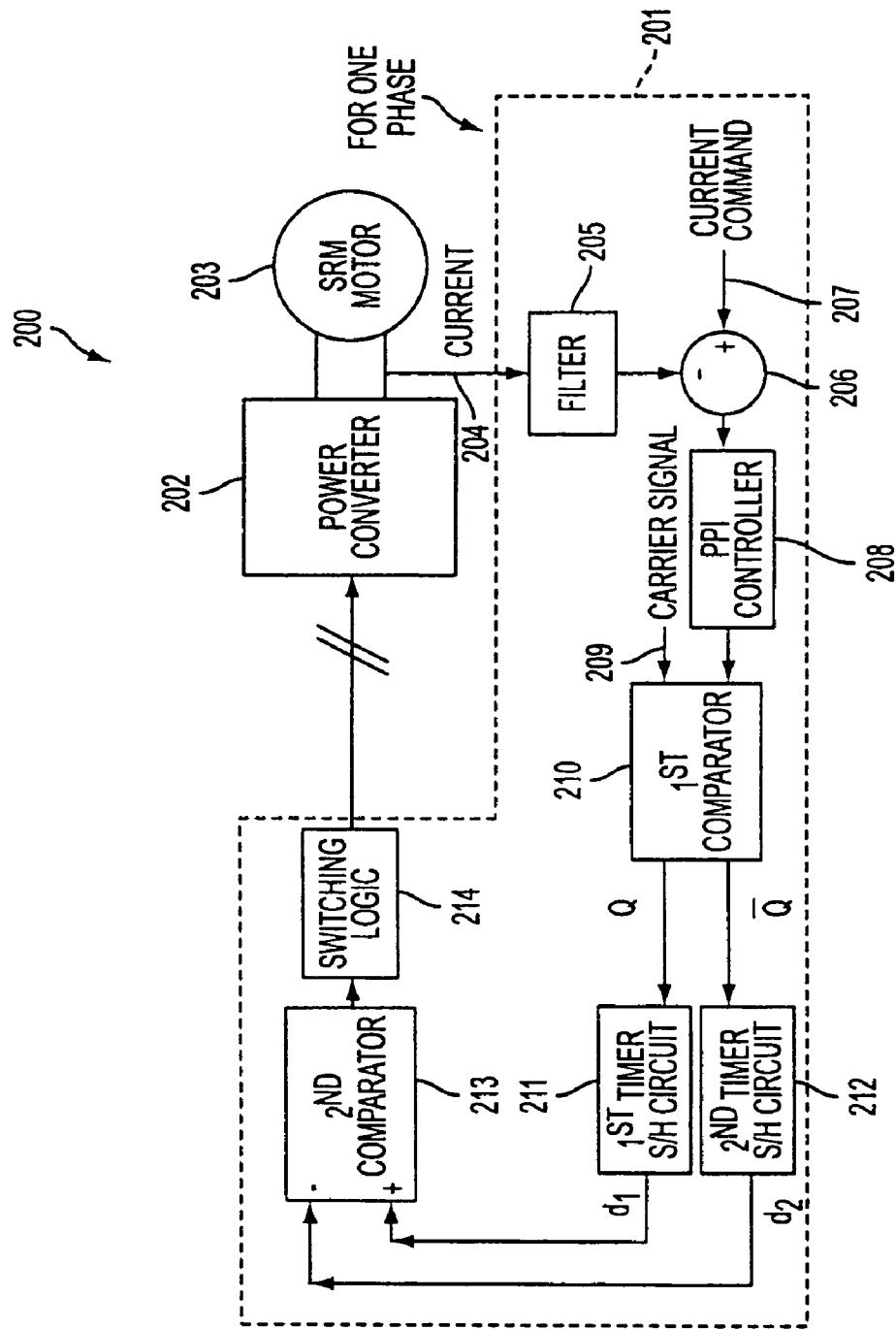
FIG. 2 illustrates an SRM having rotor position sensorless motor control.

FIG. 2 illustrates an SRM having rotor position sensorless motor control. SRM 200 has a controller 201, a power converter 202, and an SRM motor 203. Controller 201 includes a filter 205, a summer 206, a proportional plus integral (PPI) or PPI plus differential controller 208, a first comparator 210, a first timer sample and hold (S/H) circuit 211, a second timer sample and hold (S/H) circuit 212, a second comparator 213, and a switching logic 214.

Power converter 202, through a current sensor, provides to filter 205 an indication of the current supplied to motor 203's stator winding. This indication may take the form of a voltage generated by passing the stator winding current through a resistor. In some power converter topologies, this indication may be obtained without galvanic isolation. This will lead to low-cost measurement of currents.

Assume, for this description, that indications of the stator winding current and a reference current or current command 207 are provided as voltage level signals. The stator current indication is filtered by filter 205 and provided to adder 206. Adder 206 subtracts the filtered indicator of stator phase current from command current 207 to obtain the phase current error. This phase current error may be smoothed and filtered with additional controllers that may be in the form of a proportional plus integral controller 208, proportional plus integral plus differential controller, low pass filter circuit, by an intelligent controller, or by another modern controller.

Regardless of the controller used to smooth and shape this phase current error, hereafter referred to as control voltage (CV), this current error serves the purpose of generating the duty cycle using the PWM circuit (not shown). The CV is compared with a positive triangular voltage signal at a frequency known as the PWM or carrier frequency, whose period is T. The intersection (i.e., logical AND operation) of the CV and the triangular PWM signals determines the turn on (conduction) and turn off (non-conduction) durations of the controllable switch (not shown) in power converter 202.

The manner in which the control voltage is converted into the PWM duty cycles may be accomplished in many ways, but only one way is described here in relation to first comparator 210. Regardless of the manner in which it is accomplished, with either hardware or software controller implementation, the invention may use this in its realization.

The outputs of first comparator 210 are timed, sampled, and held for two successive PWM cycles in two different timer sample and hold (S/H) circuits 211 and 212, respectively. First timer S/H circuit 211 determines and holds the first duty cycle, d1, obtained at time $t_0=0$, and second timer S/H circuit 212 determines and holds the duty cycle, d2, that follows the first duty cycle (d1), after a PWM period of $t=t_0+T$. Time period $t=T$, when $t_0=0$. Second comparator 213 compares these duty cycles to obtain the difference given by d2−d1. The difference identifies whether the phase inductance is increasing, static, or decreasing. If it is increasing, then that phase has to be kept energized, as it is capable of producing motoring torque during this time. If the duty cycles are equal to each other, then the rotor position corresponds to unaligned or completely aligned stator and rotor pole positions. These positions do not produce any significant torque and, therefore, any further excitation of this stator phase is useless and has to be discontinued. If the difference between the duty cycles is negative, then the machine phase is in the negative inductive slope region, indicating that the machine phase is capable of generation, if it is excited.

Hence, depending on the comparative result provided to switching logic 214 over two successive duty cycles, switching logic controls power converter 202 to excite SRM motor 203's phase winding at an appropriate time. The implementation can be simultaneously done on each stator phase of the machine. As for the phase winding that is powering the machine, current command 207 is provided by a speed controller (not shown) or an external reference (not shown). As long as this phase is to be energized as indicated by the difference of the duty cycles, other phases need not be energized or probed to find the rotor position. When the active phase receives a commutation signal to turn off its current depending on its rotor position, the next phase that will be able to rotate the machine in the same direction of rotation can be energized and the same implementation for the rotor position estimation is initiated.

It is known that for a high performance, continuous rotor position estimation is required. For this case, an inactive phase or a phase winding that is not producing significant power can also be excited with a current command that is very small compared to the current that is passing in the winding that is powering the machine. Then, the inactive phase experiences a small current and, therefore, it is kept in the linear range of B-H characteristics of the material, where the variation of the inductance of that phase winding is negligible with current variations but has a significant variation with rotor position only. That is, the inactive phase has a linear relationship between its inductance and rotor position and is independent of stator current excitation. The use of the invention gives a precise estimation of instants of energization, when the current is injected into the winding, and de-energization, when the current is being extinguished in the winding, of the phase winding. From these estimates, controller 201 can estimate the absolute rotor position.

Figure 3:
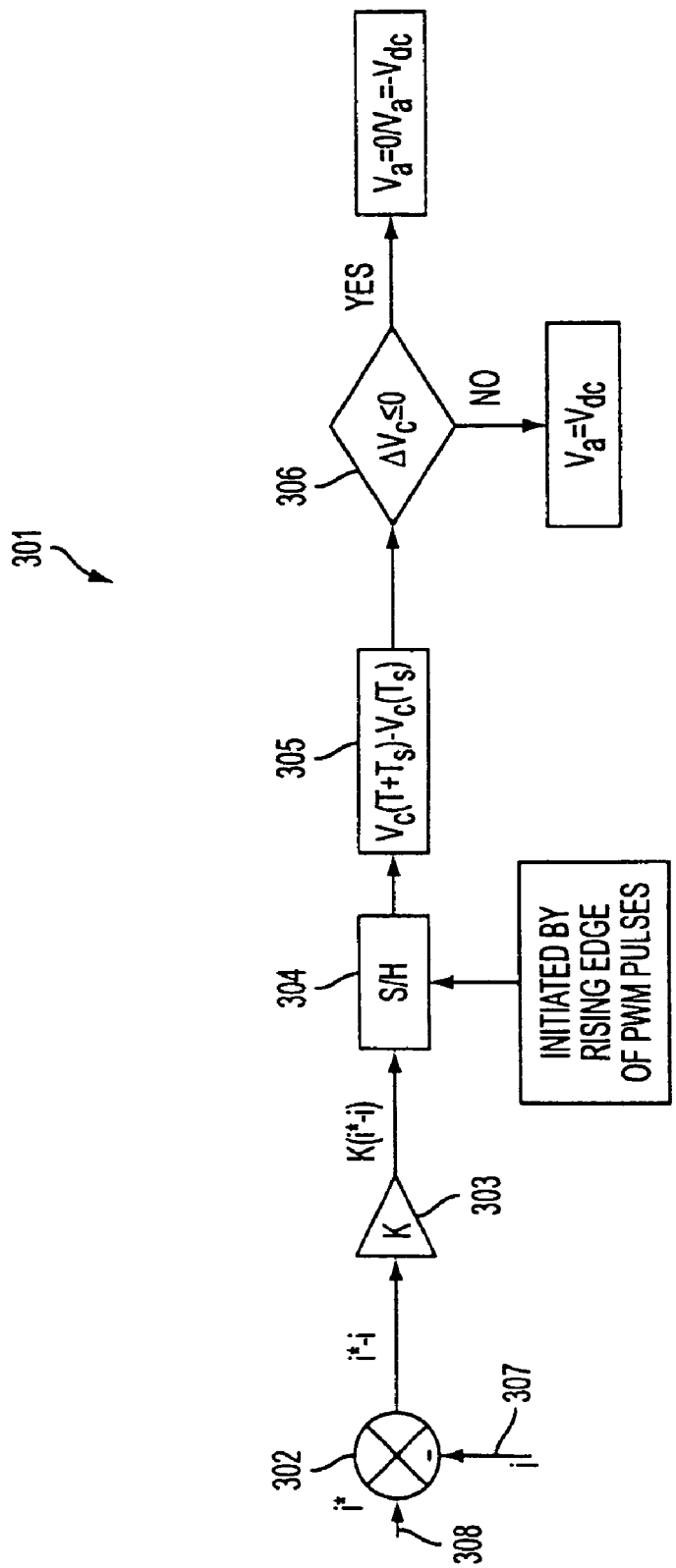
FIG. 3 illustrates a second SRM controller implementation.
Figure 4:
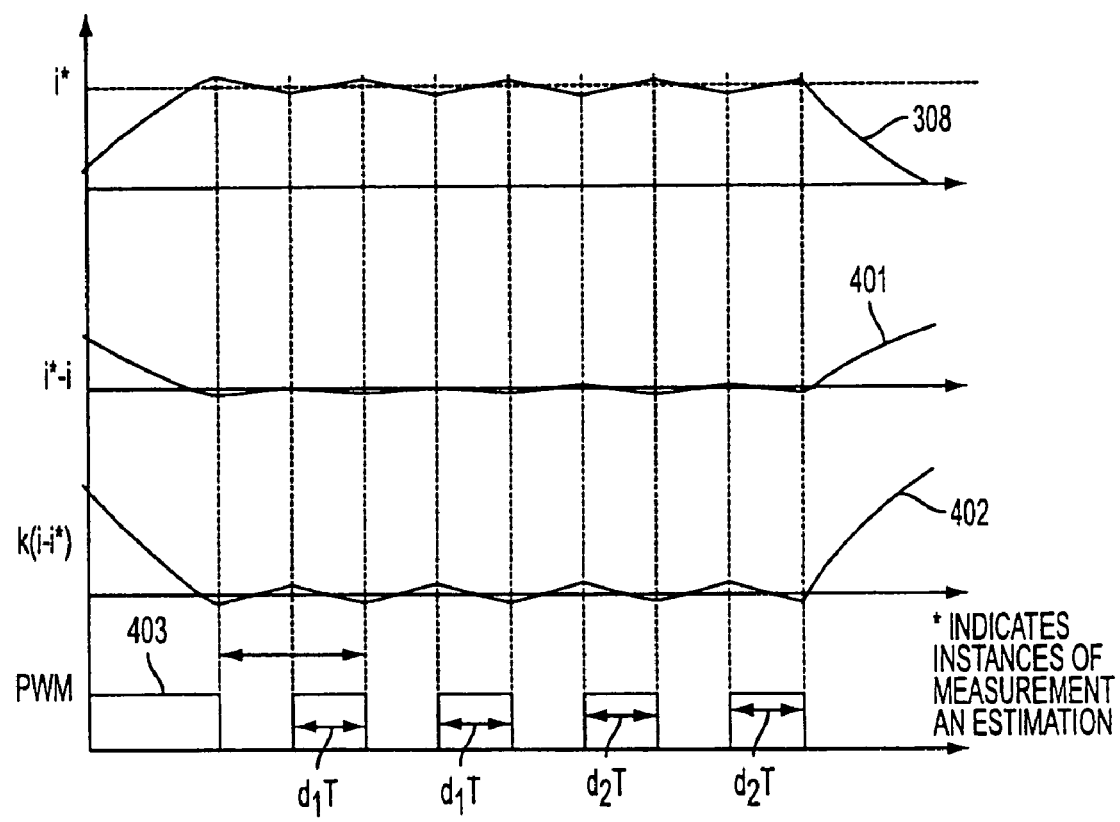
FIG. 4 illustrates a timing diagram for the operation of the SRM controller illustrated by FIG. 3.

FIG. 3 illustrates a second SRM controller implementation. FIG. 4 illustrates a timing diagram for the operation of the SRM controller illustrated by FIG. 3. Controller 301 includes a summer 302, a multiplier 303, a sample and hold (S/H) circuit 304, a comparator 305, and a switching logic 306. Summer 302 outputs the difference between a phase winding current 307 and a current command 308 as a phase current error 401. Multiplier 303 multiplies phase current error 401 by a factor K, preferably in hardware, and provides an amplified phase current error 402 to S/H circuit 304. S/H circuit 304 samples amplified phase current error 402 after receiving a rising edge of a PWM pulse 403.

The region over the first PWM cycle is irrelevant to the invention and, therefore, it can be ignored. Only the region of operation where phase winding current 307 is very close to its current command 308 value is of concern. Amplified phase current error 402 is then sampled and held for two successive intervals, at $t=Ts$, and $t=Ts+T$, so that it is sampled at the point in each of the PWM periods. Only one signal is sampled for each carrier PWM period, T, thus minimizing the amount of data to be acquired and processing time required to process it. This releases a large amount of time to other processing and decision making activities, which bear upon the quality of the control of the machine drive system.

Comparator 305 determines the difference between two subsequently sampled amplified phase current errors 402, by subtracting the earlier obtained sample from the later obtained sample. This difference is designated the decision difference. Based on this decision difference, switching logic 306 makes decisions regarding which phase that has to be kept energized or de-energized. Switching logic 306 controls power converter 202 such that a voltage $V_a=Vdc$, $-Vdc$, or zero voltage is applied across the machine phase winding. For example, if the decision difference is less than zero, switching logic 306 controls power converter 202 to apply $V_a=Vdc$. Otherwise, switching logic 306 controls power converter 202 to apply either $V_a=-Vdc$ or zero voltage.

The samples of amplified phase current error 402 are acquired at a fixed time (Ts) from the start of the PWM cycle, which is initiated by the positive rising edge of the PWM pulse itself. Controller 301 and its components 302-306 may be realized using respective functional integrated circuit chips, a digital microprocessor, or a digital signal processor using the same steps as outlined above.

Figure 5:
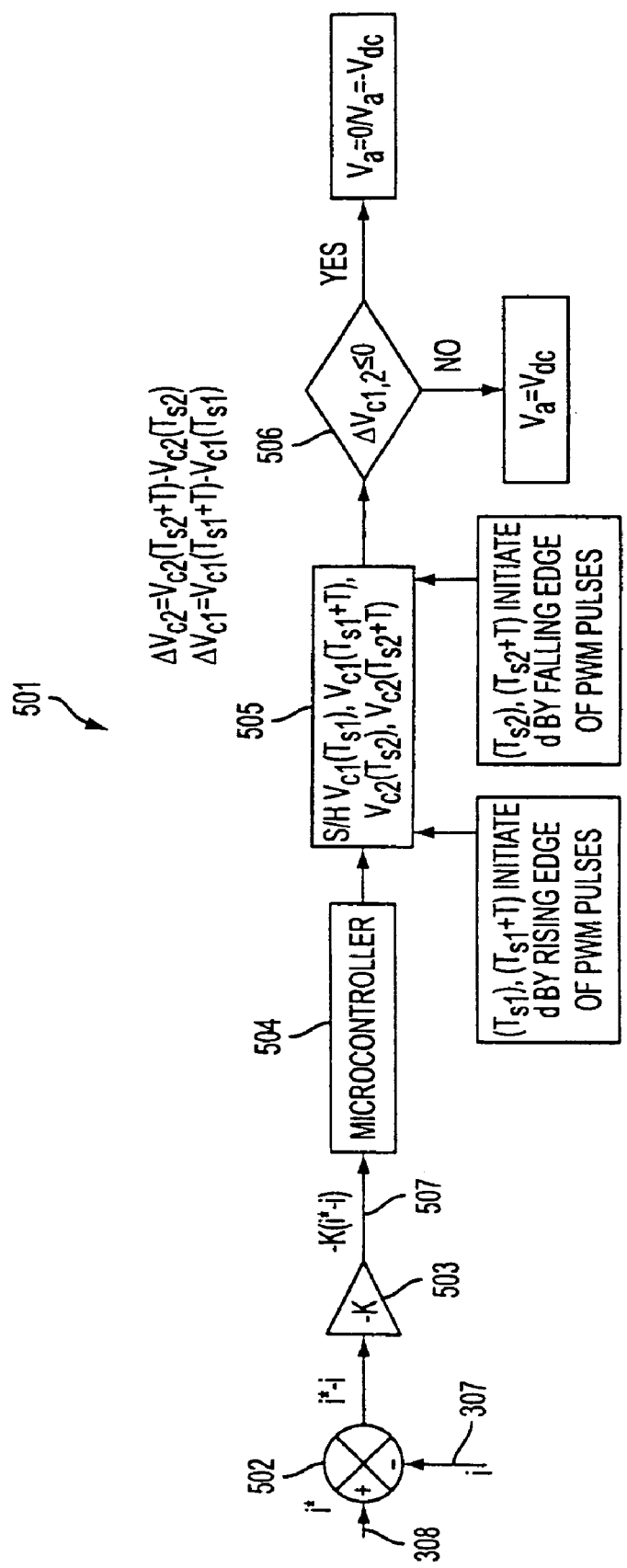
FIG. 5 illustrates a third SRM controller implementation.
Figure 6:
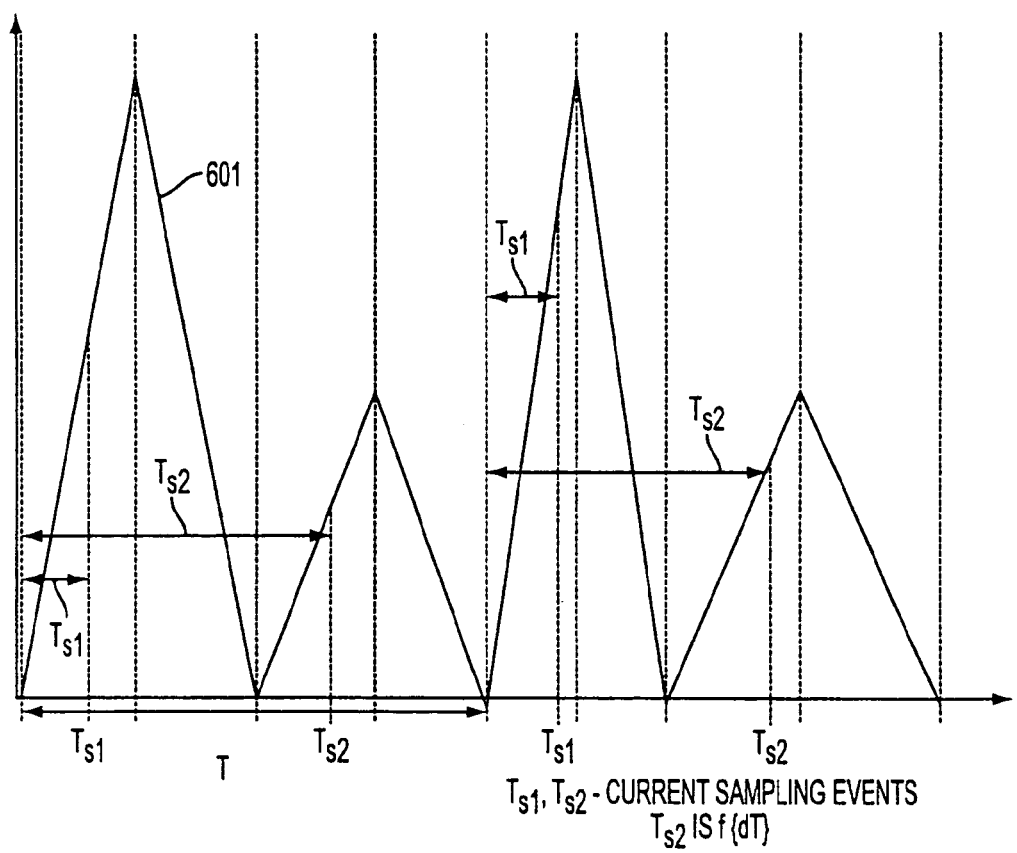
FIG. 6 illustrates a timing diagram for the operation of the SRM controller illustrated by FIG. 5; disadvantage is more in appearance rather than in reality.

FIG. 5 illustrates a third SRM controller implementation. FIG. 6 illustrates a timing diagram for the operation of the SRM controller illustrated by FIG. 5. Controller 501 includes a summer 502, a multiplier 503, a microcontroller 504, an S/H circuit 505, and a switching logic 506. Summer 502 outputs the difference between a phase winding current 307 and a current command 308 as a phase current error 401. Multiplier 303 multiplies phase current error 401 by a factor −K and provides an amplified phase current error 507 to microcontroller 504. Microcontroller 504 outputs the absolute value of amplified phase current error 507 as an absolute value phase current error 601 to S/H circuit 505. S/H circuit 505 samples absolute value phase current error 601 after receiving a rising edge of a PWM pulse 403 and, subsequently, after receiving a falling edge of PWM pulse 403.

Assume that two successive PWMs are made to have the same duty cycle; i.e., the effective change of duty cycle occurs at half the PWM frequency. Within these two PWM cycles with the same duty cycle, the current should not change if there is no change of inductance. That is detected in this implementation. Phase current error 507 is converted into absolute value phase current error 601 either in hardware or software, and an illustration of absolute phase current error 601 is shown in FIG. 6.

S/H circuit 505 samples absolute value phase current error 601 after a period Ts1 from the rising edge of PWM pulse 403 and again after a period Ts1 from the next rising edge of PWM pulse 403, where PWM pulse 403 has a period of T. Therefore, a sample of absolute value phase current error 601 is taken in each of two PWM cycles, at periods Ts1 and Ts1+T after a rising edge of PWM pulse 403 for the first PWM cycle. Likewise, a sample of absolute value phase current error 601 is taken in each of two PWM cycles, at periods Ts2 and Ts2+T after a rising edge of PWM pulse 403 for the first PWM cycle. Thereafter, switching logic 506 determines a first decision difference between the samples of absolute value phase current error taken at times Ts1 and T+Ts1 after the rising edge of PWM pulse 403. Additionally, switching logic 506 determines a second decision difference between the samples of absolute value phase current error taken at times Ts2 and T+Ts2 after the rising edge of PWM pulse 403. If both the first and second decision differences are positive, that means the inductance is decreasing. If both decision differences are negative, the inductance is increasing, and if both are zero, the inductance is not varying. The sampling instants Ts1 and Ts2 are varied depending on the duty cycles, and they can be prefixed for various values and hence do not have to be computed on line.

A word of caution in interpreting the results of the decision difference is in order here. Even though we assumed that the rate of change of inductance with respect to rotor position is same either in the positive or negative inductance slope regions of the machine, it is not the case in practice. Particularly, the rate of change of inductance with respect to position is a varying quantity, with higher values from near the unaligned rotor position to almost the aligned position. Near the aligned position, the rate of change of inductance versus rotor position usually declines and that may create a problem in interpreting the results, even though the actual inductance increases throughout if not at the same rate but at some rate. Our scheme may show that we have reached negative inductance slope near the aligned region, thereby prompting the turn off of the current in the stator phase winding. This is alright because in almost all SRM drives, advance commutation is initiated so that the current does not prolong in to the negative inductance slope region, which will result in producing a negative torque when motoring torque is desired. This will decrease the average torque produced in the machine, as well cause higher acoustic noise. Therefore, the present invention does not interfere with good machine control. With this, it is seen that the disadvantage is more in appearance rather than in reality.

Figure 7A:
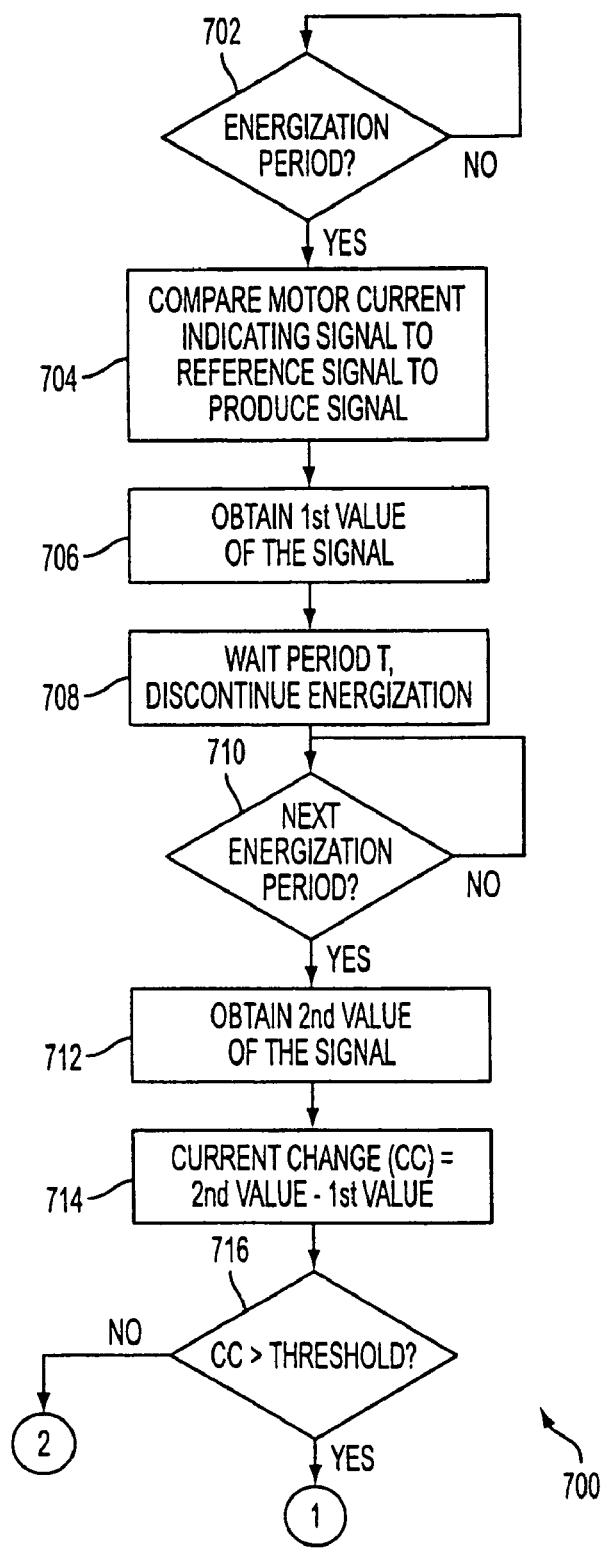
FIGS. 7A and 7B illustrate a general operational flowchart for the SRM controllers illustrated by FIGS. 2 and 3.
Figure 7B:
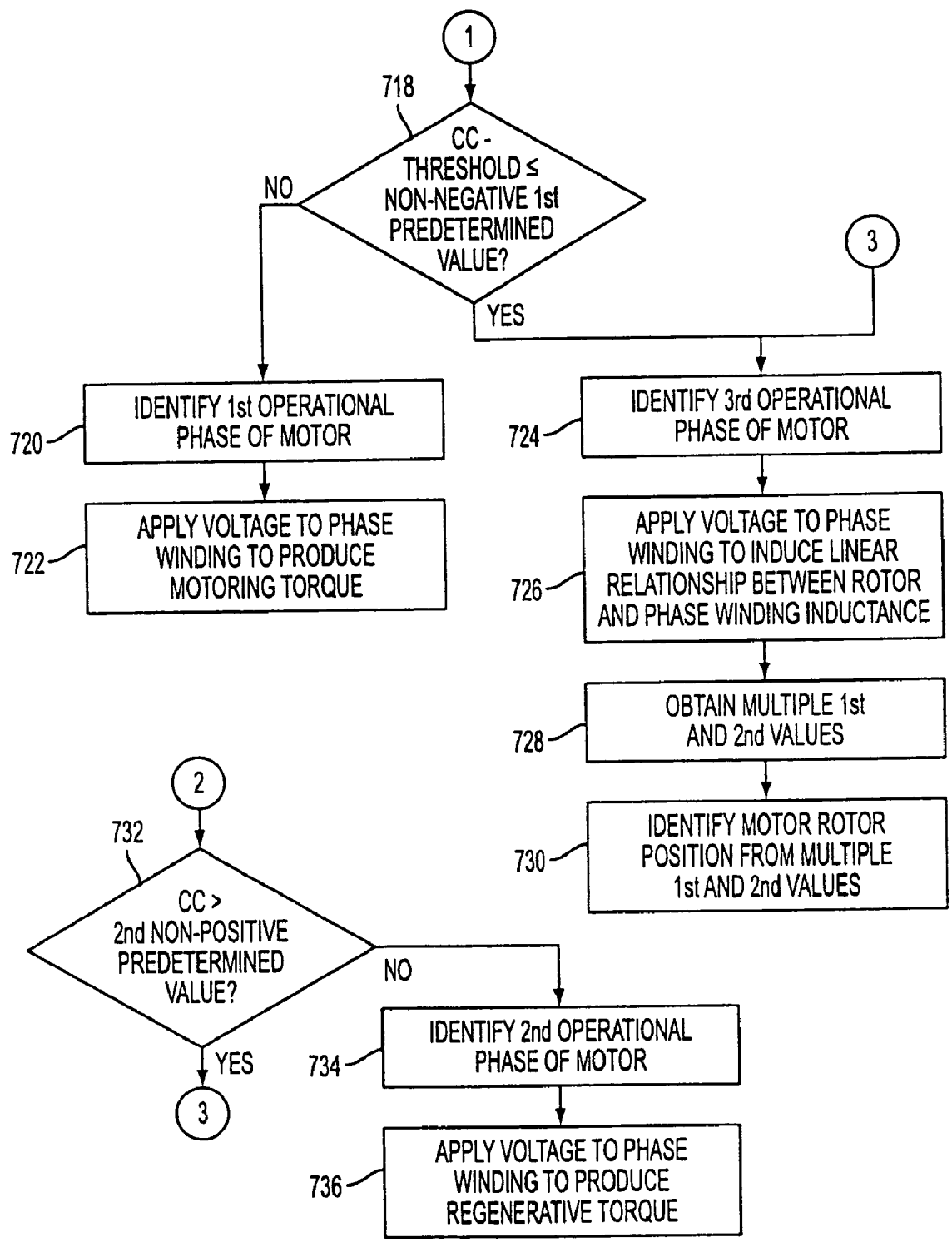

FIG. 7 illustrates a general operational flowchart for the SRM controllers illustrated by FIG. 3. When an energization period of a motor's phase winding is detected S702, a motor current indicating signal is subtracted from a reference signal and the difference is multiplied by an amplification value K to produce a signal S704 that will be sampled. A first value of the signal is obtained S706 by sampling and stored. A second value of the signal is obtained S712 after a period T has expired S708. During period T, energization of the phase winding discontinues for some period of time S708 before being reinitiated in a next energization period. Therefore, samples of the signal are obtained in two sequential energization periods of the phase winding S710. Alternatively, the signal may be sampled in two consecutive non-energization periods, with an intervening energization period.

After the two samples are obtained S708-S712, the first value is subtracted from the second value to obtain a current change 714. If the current change exceeds a non-negative threshold value S716 by more than a first predetermined value S718, a first operational phase of the motor is identified S720. The first operational phase indicates the phase winding inductance is increasing. In response to this identification, the controller instructs a power converter to apply a voltage across the phase winding to produce motoring torque S722. The threshold and first predetermined values are selected in accordance with the particular application to provide an accurate identification of the motor's operational phase, under the variety of operational circumstances in which the motor will be used.

If the current change exceeds the threshold value by no more than the first predetermined value S718, then a third operational phase of the motor is identified S724. The third operational phase indicates the currents at two different instants of sampling are close to each other in value. This means that the inductance is flat and, hence, its slope with respect to position is close to zero, which indicates a near aligned or near unaligned position. Therefore, the third operational phase indicates that the motor's rotor is not well positioned with respect to the motor's stator for this phase winding to generate either motoring or regenerative torque.

However, the third operational phase provides an opportunity to use the phase winding in a mode that accurately determines the rotor's position with respect to the stator. In support of this mode, the controller instructs the power converter to apply a small voltage across the phase winding S726. This small voltage may be generated using a smaller duty cycle to turn the gate pulse on or by setting a small current command to obtain the same result. This voltage or current reference need only be large enough to induce a linear relationship between the rotor position and the phase winding inductance and also to produce a minimum of torque. Thereafter, multiple first and second values of the difference between the current indicating signal and the reference current are obtained S728 in a manner similar to that identified by steps S706, S708, and S712. From these multiple first and second values, the controller more precisely determines the rotor position S730.

If comparison S716 reveals that the current change does not exceed the threshold value, then another comparison is made to determine if the current change exceeds a non-positive second predetermined value S732. If so, the third operational phase is identified S724. Otherwise, a second operational phase is identified S734, indicating the phase winding inductance is decreasing with time. During the second operational phase, the controller may instruct the power converter to apply an appropriate voltage to the phase winding to produce regenerative torque in the motor S736. Process 700 may be applied to every independent phase winding of the motor.

Figure 8A:
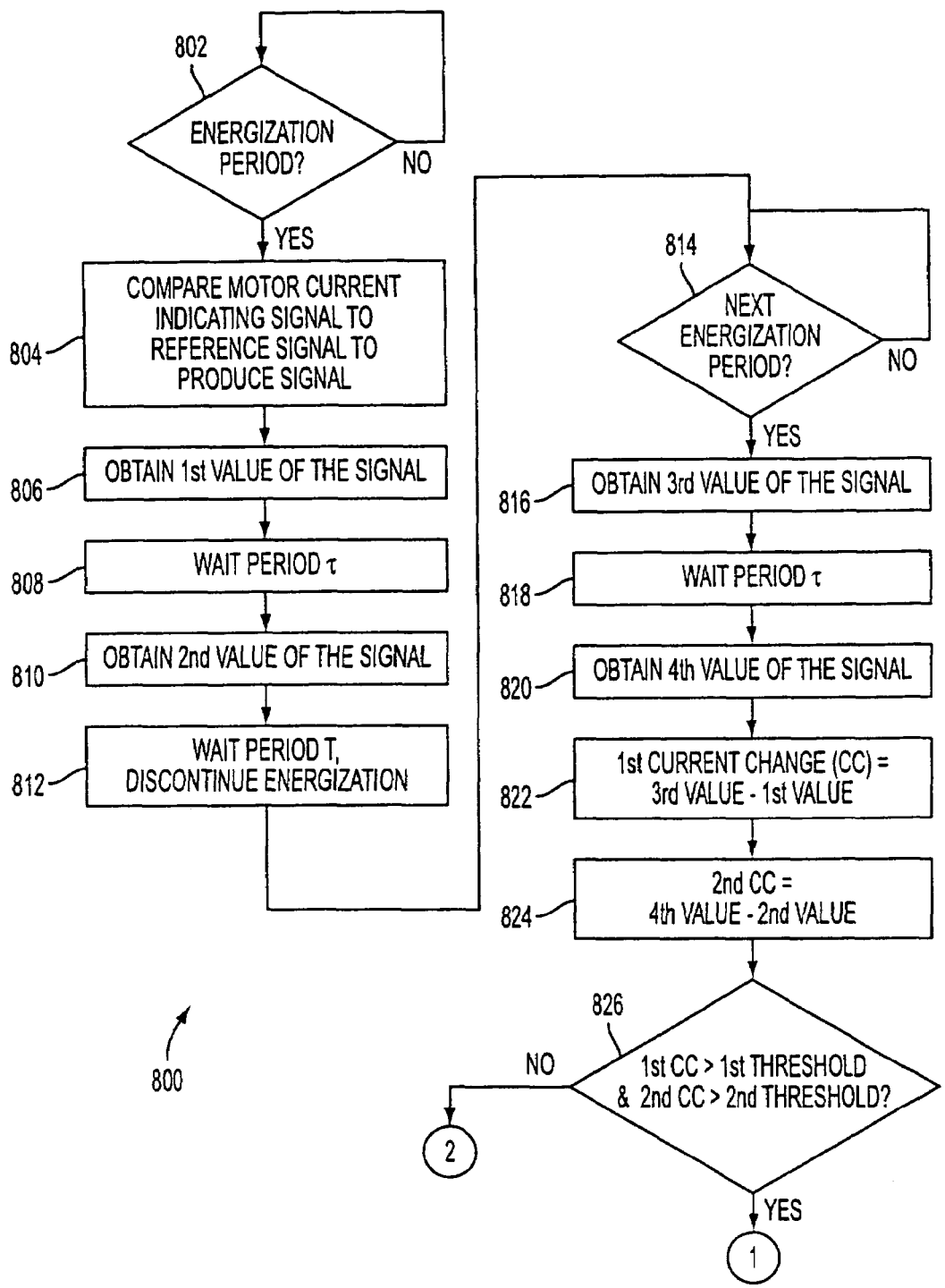
FIGS. 8A and 8B illustrate a general operational flowchart for the SRM controller illustrated by FIG. 5.
Figure 8B:
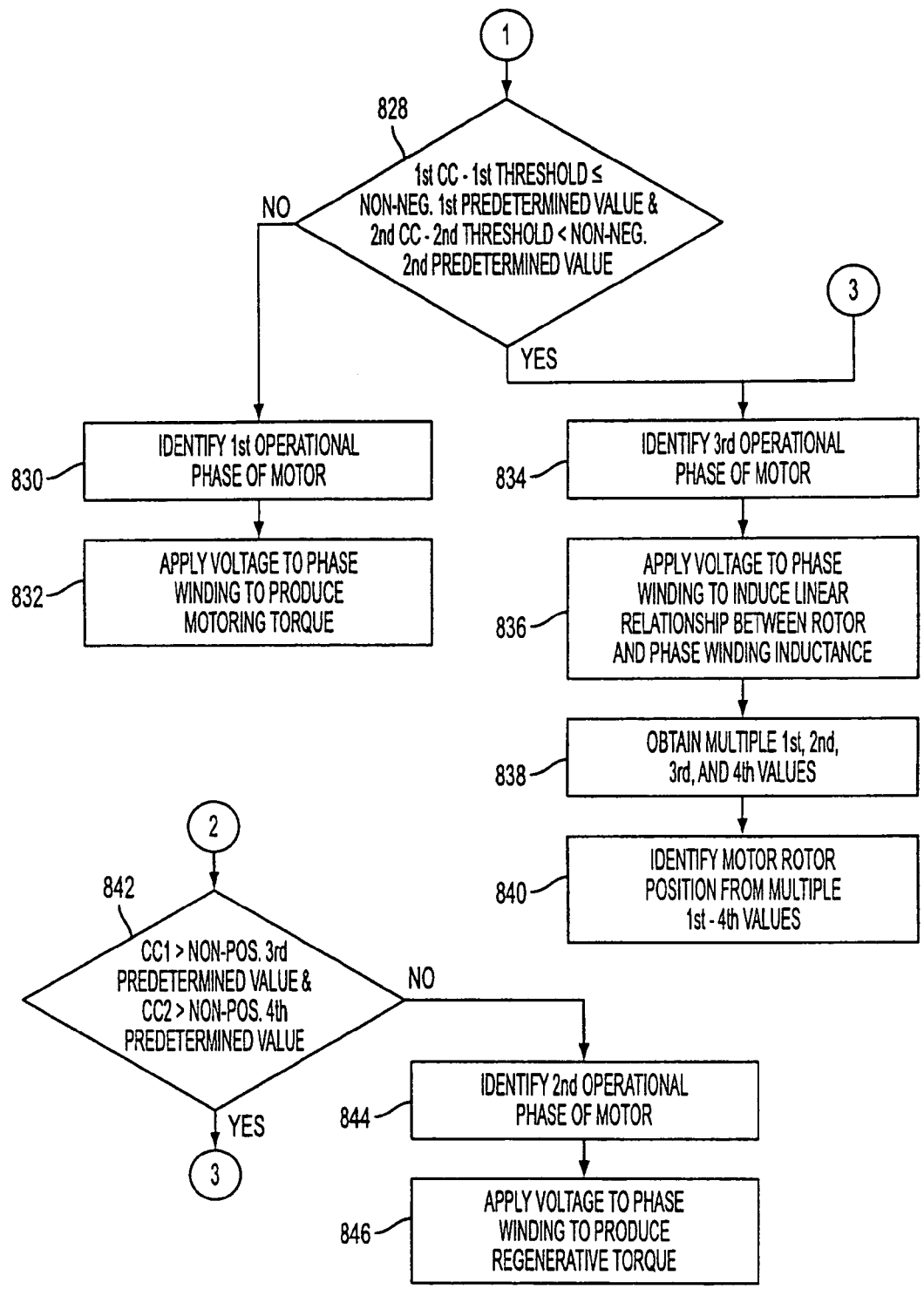

FIG. 8 illustrates a general operational flowchart for the SRM controller illustrated by FIG. 5. When an energization period of a motor's phase winding is detected S802, a motor current indicating signal is compared to a reference signal to produce a signal S804 that will be sampled. A first value of the signal is obtained S806 by sampling and stored. A second value of the signal is obtained S810 after a period τ has expired S808. Period τ may be selected to ensure that energization of the phase winding has discontinued for the PWM pulse cycle in which the first value was sampled. Another period T expires S812 before a third value of the signal is obtained S816. Periods τ and T may be established such that their sum equals the period of the PWM pulse cycle. In such a case, the third value is obtained during the next energization period S814. A fourth value of the signal is obtained after a period τ expires from obtaining the third value. Therefore, a pair of signal samples are obtained in each of two sequential energization periods of the phase winding.

After the two samples are obtained S806-S820, the first value is subtracted from the third value to produce a first current change S822 and the absolute value of the second value is subtracted from the absolute value of the fourth value to produce a second current change S824. If the first current change exceeds a non-negative first threshold value S826 by a first predetermined value S828 and the second current change exceeds a non-negative second threshold value S826 by a second predetermined value S828, then a first operational phase of the motor is identified S830. The first operational phase indicates the phase winding inductance is increasing. In response to this identification, the controller instructs a power converter to apply a voltage across the phase winding to produce motoring torque S832.

If the first current change exceeds the first threshold value S826 but not by more than the first predetermined value S828 and the second current change exceeds the second threshold value S826 but not by more than the second predetermined value S828, then a third operational phase of the motor is identified S834. The third operational phase indicates that the inductance is flat and, hence, its slope with respect to position is close to zero, which indicates a near aligned or near unaligned position. Therefore, the third operational phase indicates that the motor's rotor is not well positioned with respect to the motor's stator for this phase winding to generate either motoring or regenerative torque.

However, the third operational phase provides an opportunity to use the phase winding in a mode that accurately determines the rotor's position with respect to the stator. In support of this mode, the controller instructs the power converter to apply a small voltage across the phase winding S836. This voltage need only be large enough to induce a linear relationship between the rotor position and the phase winding inductance and also to produce a minimum of torque. Thereafter, multiple first, second, third, and fourth values of the difference between the current indicating signal and the reference current are obtained S838 in a manner similar to that identified by steps S806-812 and 816-820. From these multiple first, second, third, and fourth values, the controller more precisely determines the rotor position S840.

If comparison S826 has a negative result, then a determination is made whether the first and second current changes exceed third and fourth non-positive predetermined values, respectively, S842. If so, the third operational phase is identified S834. Otherwise, a second operational phase is identified S844, indicating the phase winding inductance is decreasing with time. During the second operational phase, the controller may instruct the power converter to apply an appropriate voltage to the phase winding to produce regenerative torque in the motor S846. Process 800 may be applied to every independent phase winding of the motor.

SRM controllers 201, 301, and 501 provide the following advantages:

1. They do not require any other feedback signals other than current signals. The current feedback signals are usually available in the drive systems and, therefore, the system uses minimum sensors for its implementation and, hence, will be inexpensive.

2. They do not require any elaborate filtering or estimation techniques, as they only require comparing two successive pulse width modulation cycles or carrier cycles.

3. They only require simple sample and hold circuits for realizing the information as to which region the machine is in at a given moment.

4. Processes 700 and 800 work for these controllers from standstill to maximum speed.

5. They can generate the absolute rotor position from the sampled information. For example, when two succeeding duty cycles are equal, indicating either the unaligned or aligned position, a further determination of whether position is aligned or not may be made by observing the subsequent duty cycle. In the case of aligned rotor position, the duty cycle will subsequently decrease. In the case of unaligned rotor position, the duty cycle will subsequently increase.

6. For simple control synthesis, the continuous information on rotor position is not required. In this case, only a rough determination of the rotor's position need be obtained for energizing and commutating each phase of the SRM.

7. Power switching noise does not interfere with the operation of these controllers, since they use current signals that are filtered by the machine winding. Therefore, these signals do not carry much noise.

8. Isolation of current signals is not necessary when they are resistor based, for circuits with all their emitters tied together. Many such topologies exist, including many disclosed by the present inventor in the referenced co-pending patent applications. This reduces the cost of implementing the controller and provides the least expensive way of realizing the control signals by estimation of rotor position.

9. In software, the realization of the controllers is very simple, as the current error, which is the control voltage, is available at all times and it is easy to store its values for two succeeding cycles and take their difference. It involves a very few operations compared to the slightly more involved analog circuit implementation.

10. The controllers implement a simple algorithm that does not involve differentiation of signals, extensive computation, or signal processing.

Several different implementations of the invention have been described that each rely upon the presence of a PWM signal. However, this signal need not be present to apply the invention. Instead, a different way of implementing the invention may be achieved using a current controller that provides a hysteresis window operation. A description of this hysteresis window operation is provided in "Electric Motor Drives: Modeling, Analysis and Control", R. Krishnan, Prentice Hall, February 2001. This alternative implementation provides a distinct advantage in that only the actual conduction time of the controllable switches that control the phase winding of an SRM must be measured.

Figure 9:
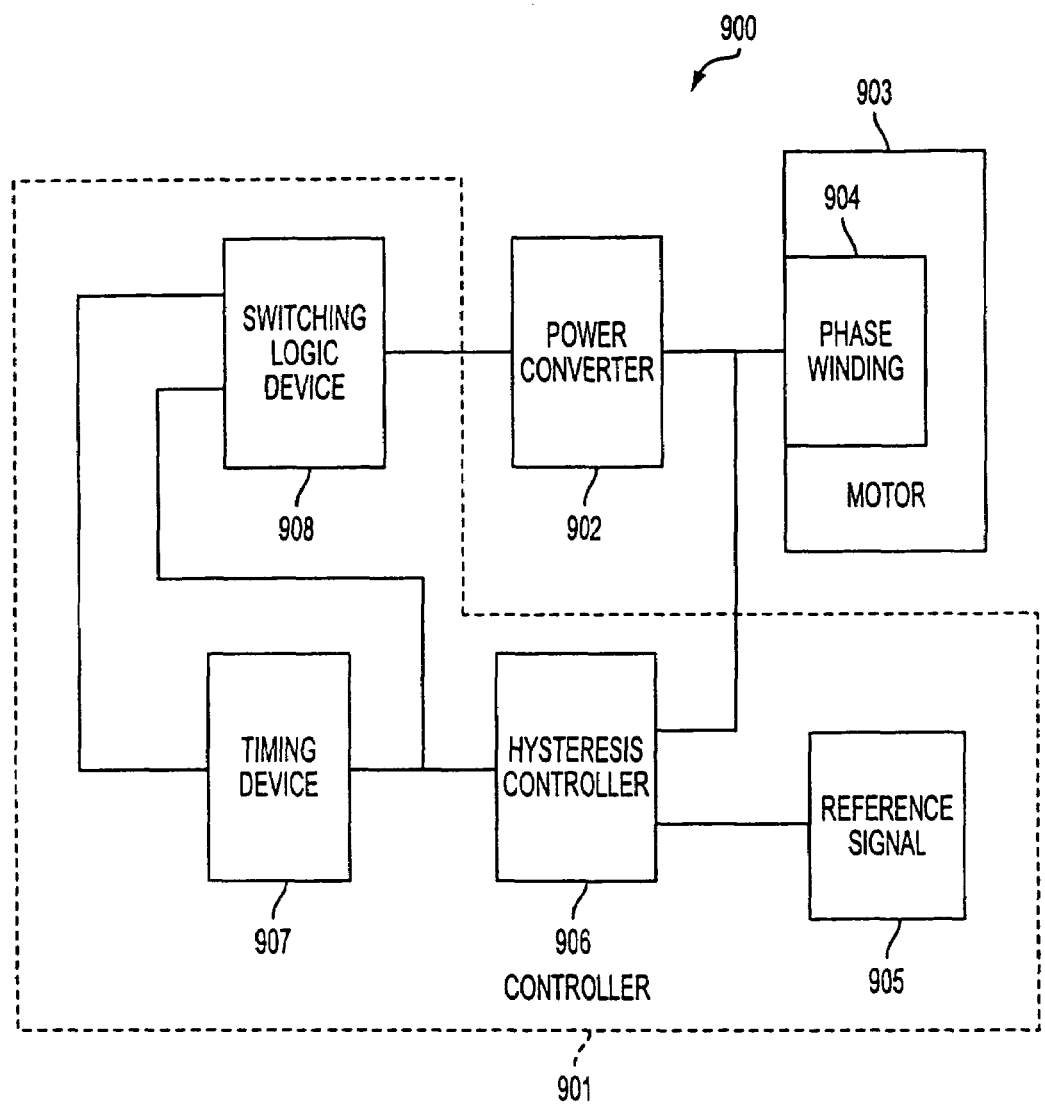
FIG. 9 illustrates another SRM having rotor position sensorless motor control.
Figure 10:
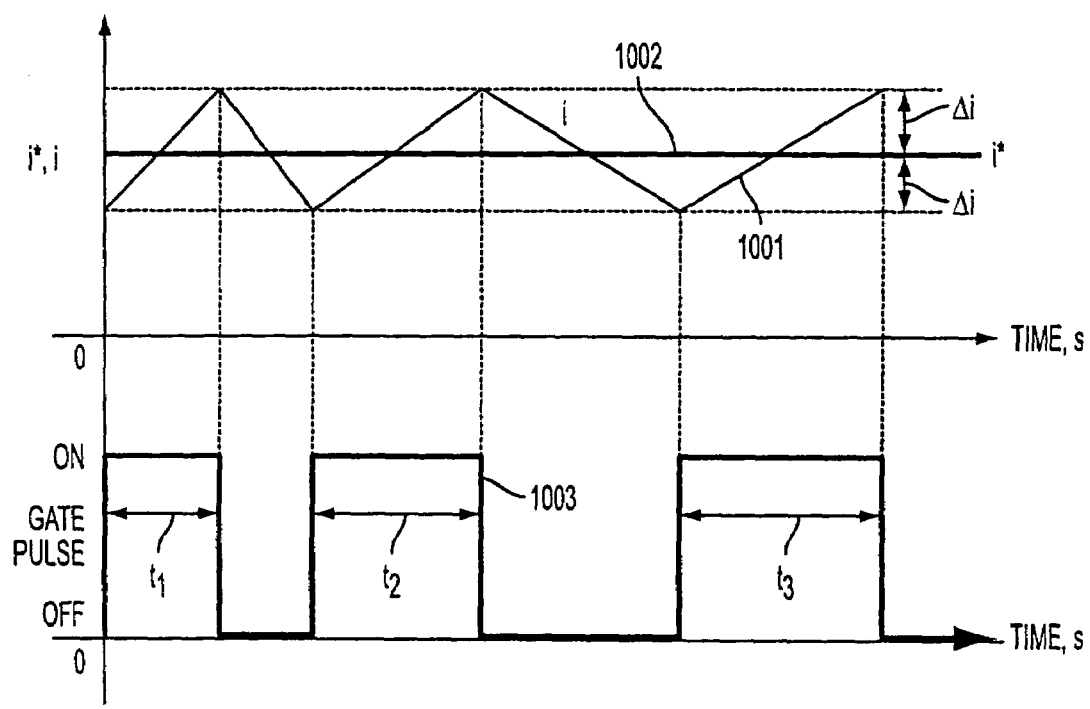
FIG. 10 illustrates an operational timing diagram for the SRM illustrated by FIG. 9.

FIG. 9 illustrates another SRM having rotor position sensorless motor control. FIG. 10 illustrates an operational timing diagram for the SRM illustrated by FIG. 9. SRM 900 includes a controller 901, a power converter 902, and a motor 903. Controller 901 has a hysteresis controller that receives an indication of the current 1001 provided by power converter 902 to a phase winding 904 of motor 903. Hysteresis controller compares this indication of current 1001 with an indication of a reference current 1002 provided by reference signal device 905.

In the operational regions where an applied voltage to phase winding 904 may produce motoring or regenerative torque, current indication 1001 does not differ from its reference or command value by more than a difference (i.e., small window), $\pm \Delta i$. For the moment, the operational regions where the current starts to catch up with the reference or where the current is being turned off are ignored.

When the phase winding and reference currents differ by less than $\pm \Delta i$, hysteresis controller 906 generates gate pulses 1003 by comparing the reference current indication 1002 to the phase winding current indication 1001. As may be seen by inspection of FIG. 10, each of gate pulses 1003 may have differing on-time durations. For example, the three illustrated gate pulses 1003 have on-time durations of t1, t2 and t3, respectively. The combined on- and off-time durations for successive pulses are not necessarily the same.

As described previously in relation to equation 17, an increasing phase winding inductance corresponds to an increased duration of gate pulse on-time. Similarly, a decreased inductance corresponds to a decreased on-time duration and a constant inductance corresponds to a constant on-time duration. Therefore, the successive pulse durations and their difference will indicate whether the phase winding inductance is increasing, decreasing, or static. The combined on- and off-time durations for successive pulses are not necessarily the same for this implementation, as was the case previously.

A timing device 907 may be implemented either by hardware, software, or a combination thereof. The hardware means may convert the on gate pulses into average voltage signals per each conduction period and then compare two successive samples of these signals with a comparator, to determine the region of machine's operation in the positive, negative, zero inductance slope region. The software means may use a timer to compute the duration of the on gate pulse and then store two successive ones for comparison.

Hysteresis controller 906 generates the gate pulses from a comparison of the phase winding and reference current indicators 1001 and 1002, respectively. These gate pulses are provided to timing device 907 and switching logic device 908. The gate pulses are on when they are nonzero. The rising and falling edges of the on gate pulses are used to clock timing device 907 so that the time difference between them is determined and stored. After the on-times for two successive gate pulses have been measured, switching logic device 908 subtracts the earlier measured value from the later measured value, to obtain the difference between the two on gate pulses' duration. This duration is then processed by switching logic device 908 to identify the inductance region of phase winding 904.

If the phase winding inductance is increasing, switching logic device 908 may apply the gating pulses provided by hysteresis controller 906 to an energization switch of power converter 902. In so doing, switching logic device 908 causes phase winding 904 to generate motoring torque in motor 903.

If the phase winding inductance is decreasing, switching logic device 908 may control power converter 902 such that it induces regenerative torque in motor 903. If the phase winding inductance is constant, switching logic device 908 may control power converter 902 to withhold applying a voltage to phase winding 904.

Figure 11A:
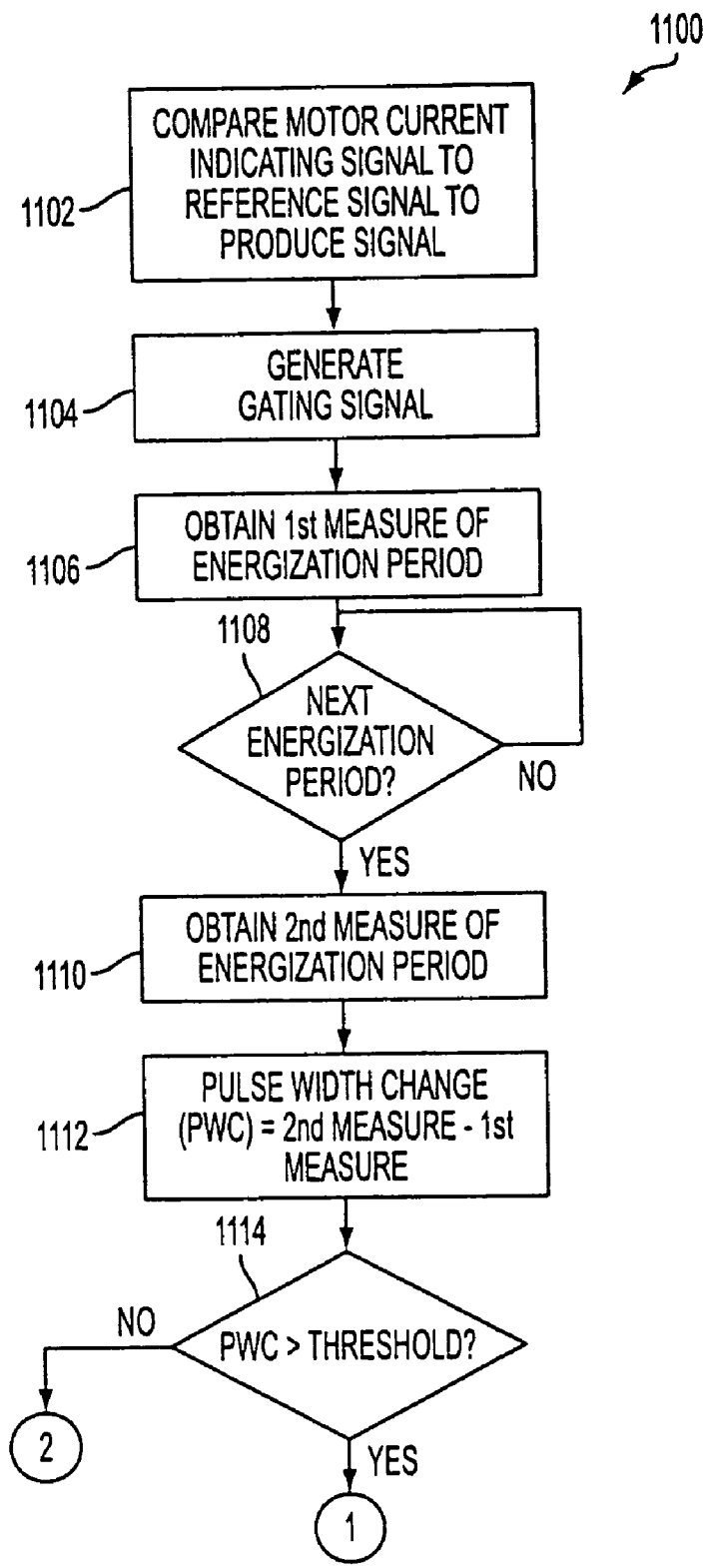
FIGS. 11A and 11B illustrate a general operational flowchart for the SRM controller illustrated by FIG. 9.
Figure 11B:
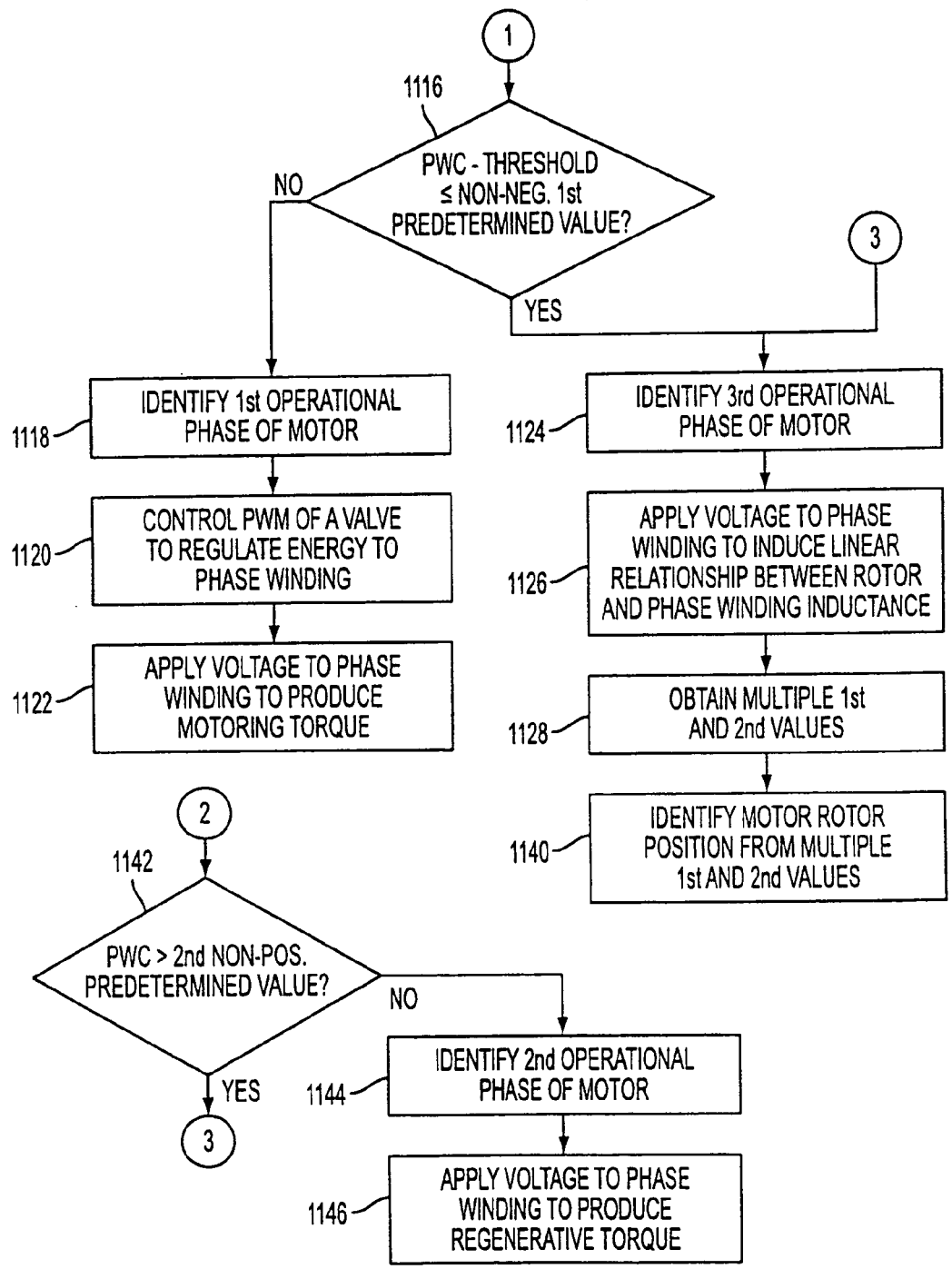

FIG. 11 illustrates a general operational flowchart for the SRM controller illustrated by FIG. 9. Hysteresis controller 906 compares S1102 the signal indicating the amount of current being provided to phase winding 904 to a signal received from reference signal device 905, which indicates an amount of current of a reference signal. Based on this comparison hysteresis controller 906 generates a gating signal S1104. Timing device 907 obtains a measure of a first energization period by measuring the on-time of a first gating signal pulse S1106. In a subsequent energization period S1108, timing device 907 obtains a measure of a second energization period by measuring the on-time of a second gating signal pulse S1110.

Switching logic 908 subtracts the first measured pulse width from the second measured pulse width to obtain a pulse width change S1112. If the pulse width change exceeds a non-negative threshold value S1114 by more than a first predetermined value S1116, then a first operational phase of the motor is identified S1118 for phase winding 904. The first operational phase indicates the phase winding inductance is increasing. In response to this identification, switching logic 908 applies S1120 the gating signal provided by hysteresis controller 906 to a valve of power converter 902. The valve may be a transistor, for instance, that provides energy to phase winding 904 under the control of the PWM pulses of the gating signal. In response to the gating signal, the valve applies a voltage S1122 to phase winding 904 to generate motoring torque in motor 903.

If the pulse width change exceeds the non-negative threshold value S1114 by not more than the first predetermined value S1116, then a third operational phase of phase winding 904 is identified S1124. The third operational phase indicates that the inductance is flat and, hence, its slope with respect to position is close to zero, which indicates a near aligned or near unaligned position. Therefore, the third operational phase indicates that the motor's rotor is not well positioned with respect to the motor's stator for this phase winding to generate either motoring or regenerative torque.

However, the third operational phase provides an opportunity to use phase winding 904 in a mode that accurately determines the rotor's position with respect to the stator. In support of this mode, switching logic device 908 instructs power converter 902 to apply S1126 a small voltage across phase winding 904. This voltage need only be large enough to induce a linear relationship between the rotor position and the phase winding inductance and also to produce a minimum of torque. Thereafter, multiple first and second pulse widths are measured S1128 in a manner similar to that identified by steps S1102-S1110. From these multiple measurements, switching logic device 908 more precisely determines the rotor position S1130.

If comparison S1114 has a negative result and the pulse width change exceeds a non-positive $2^{nd}$ predetermined value S1132, then the third operational phase is identified S1124. Otherwise, a second operational phase is identified S1134, indicating the phase winding inductance is decreasing with time. During the third operational phase, the switching logic device 908 may instruct power converter 902 to apply S1136 an appropriate voltage to phase winding 904 to produce regenerative torque in motor 903. Process 1100 may be applied to every independent phase winding of the motor.

Controller 900 provides the following advantages:

1. It always keeps the current in phase winding 904 within the desired level. Therefore, good torque control is exercised even when machine control is being assessed.

2. It does not rely on a current error. Therefore, there is no need to smooth the current error to obtain a good control voltage. This leads to very little delay in the control or measuring circuit, thereby providing precise results.

3. It is easy to visualize and implement either in software or hardware.

4. Since it uses hysteresis current control to detect the operating region, the scheme is fast acting, due to the instantaneous fast acting nature of the hysteresis current controller.

5. It requires only the phase currents to identify the operational region of the phase winding's inductance, thus simplifying the transducer requirement and lowering the controller's cost.

6. In the case where inactive phases are probed to assess the region of operation, the current command can be kept at a minimum, with the attendant current window, so as to minimize the undesirable torque from these phases during the active machine phase operation. The operating inductance region assessment can be speeded up by adjusting the current window to smaller values that, in turn, will increase the switching of the inactive phases. This has the drawback of increasing switching losses in the controllable switches of the inactive phases. Therefore, care has to be exercised in selecting the current window.

7. With a processor-based implementation, no other additional external circuits are necessary to implement this scheme, thus greatly compacting the controller package.

8. It may be combined with any power converter arrangement for the SRM drive system.

9. If it is undesirable to use a hysteresis current controller in the SRM drive, then the hysteresis current controller may be used only with the inactive phases, to estimate the operating inductance region. During times of regular drive operation, a PWM current control can be resorted to. This will not result in a huge computational or implementation burden for a processor-based drive control system.

The controllers described herein provide the following advantages:

1) A method to determine the operating inductance regions (positive or negative or zero slope regions) of the SRM with only sensed currents.

2) A method that is suitable for implementation in active and inactive phases.

3) A method that is ideal for SRMs with any number of phases including a single phase SRM.

4) A method to determine the regions of operation but not explicitly the absolute rotor position.

5) A method that does not need any modification to the machine design, power converter arrangement, or current controller that may be used in the system.

6) A method that uses a PWM current controller and its inputs (control voltages) or outputs (duty cycles) for active and or inactive phases.

7) A method that samples and holds successive control voltages for comparison to find the decision difference.

8) A method which can sample the current error or control voltage twice in a PWM cycle and, thereby, increase the accuracy and speed of determining the operating region of the SRM.

9) A method which can sample the current error or control voltage once in a PWM cycle.

10) A method that operates only at the PWM frequency and is, therefore, free of noise related problems in the circuit.

11) A method that uses a hysteresis controller to find the operating region using only the time duration difference between two on gate pulses of the converter phase that supplies the machine phase winding.

12) A method in which the hysteresis controller is used with variable current windows to increase the speed of estimation of the region of operation.

13) A method in which the hysteresis controller is used with variable current commands to probe the inactive machine phases.

14) A method in which the hysteresis controller is used for estimation of the operating region, but PWM current control is used for normal operation of the machine phases.

15) A method to implement the PWM current controller based implementation.

16) A method to implement the hysteresis current controller based implementation.

17) A method that does not use the differentiation or integration of the phase current, dc bus current, voltage across the winding, or any other signals other than the measured current and current commands and hysteresis window in the hysteresis controller based implementation.

18) A method that does not use the differentiation or integration of the phase current, dc bus current, voltage across the winding, or any other signals other than the measured current and current commands in the PWM controller based implementation.

The foregoing description illustrates and describes the present invention. However, the disclosure shows and describes only the preferred embodiments of the invention, but it is to be understood that the invention is capable of use in various other combinations, modifications, and environments. Also, the invention is capable of change or modification, within the scope of the inventive concept, as expressed herein, that is commensurate with the above teachings and the skill or knowledge of one skilled in the relevant art.

The embodiments described herein are further intended to explain best modes known of practicing the invention and to enable others skilled in the art to utilize the invention in these and other embodiments, with the various modifications that may be required by the particular applications or uses of the invention. Accordingly, the description is not intended to limit the invention to the form disclosed herein.

What is claimed is:

1. A method for identifying an operational phase of a motor, the method comprising:
   obtaining a first value of a signal that is indicative of the operational phase of the motor;
   obtaining a second value of the signal after a first time period has expired;
   obtaining a third value of the signal after a second time period has expired;
   obtaining a fourth value of the signal after a third time period has expired;
   determining a first change identifying a change between the first and third values with time;
   determining a second change identifying a change between the second and fourth values with time;
   identifying a first operational phase of the motor for the first change exceeding a first threshold value by more than a non-negative first predetermined value and the second change exceeding a second threshold value by more than a non-negative second predetermined value;
   identifying a second operational phase of the motor for the first change not exceeding the first threshold value, the second change not exceeding the second threshold value, the first change not exceeding a non-positive third predetermined value, and the second change not exceeding a non-positive fourth predetermined value; and
   operating the motor in accordance with the identified operational phase.

2. The method of claim 1, wherein:
   the first and second values are obtained during a first energization period of a phase winding of the motor;
   the third and fourth values are obtained during a second energization period of the phase winding; and
   energization of the phase winding discontinues between the second and third energization periods.

3. The method of claim 2, wherein the first time period is determined from an energization duty cycle of the phase winding.

4. The method of claim 3, wherein the sum of the first and second time periods is substantially equal to the energization duty cycle.

5. The method of claim 1, further comprising:
   comparing another signal, which is indicative of an amount of current flowing through a phase winding of the motor, to a reference signal to obtain the signal that is indicative of the motor's operational phase, wherein
   the second change identifies the change between the absolute values of the second and fourth values with time.

6. The method of claim 5, wherein the first operational phase indicates the inductance of the phase winding is increasing with time.

7. The method of claim 1, further comprising applying a voltage across a phase winding of the motor to increase the value of the signal and produce motoring torque in the motor, during a period when the first operational phase is identified.

8. The method of claim 1, further comprising applying a voltage across a phase winding of the motor to decrease the value of the signal and produce regenerative torque in the motor, during a period when the second operational phase is identified.

9. The method of claim 1, further comprising identifying a third operational phase of the motor for the first change exceeding the first threshold value by no more than the non-negative first predetermined value and the second change exceeding the second threshold value by no more than the non-negative second predetermined value.

10. The method of claim 9, further comprising refraining from applying a voltage across a phase winding of the motor, during a period when the third operational phase is identified.

11. The method of claim 9, further comprising:
    applying a voltage across a phase winding of the motor, during a period when the third operational phase is identified, that produces a current that preserves a linear relationship between a position of a rotor of the motor and the inductance of the phase winding and that induces substantial independence between the phase winding inductance and the current;
    obtaining multiple first, second, third, and fourth values during a period a rotor pole of the motor traverses a rotor pole pitch angle; and
    identifying the position of the rotor relative to a stator of the motor, based on information obtained from the multiple first, second, third, and fourth values.

12. The method of claim 1, further comprising identifying a third operational phase of the motor for the first change not exceeding the first threshold value, the second change not exceeding the second threshold value, the first change exceeding the non-positive third predetermined value, and the second change exceeding the non-positive fourth predetermined value.

13. The method of claim 12, further comprising:
    applying a voltage across a phase winding of the motor, during a period when the third operational phase is identified, that produces a current that preserves a linear relationship between a position of a rotor of the motor and the inductance of the phase winding and that induces substantial independence between the phase winding inductance and the current;
    obtaining multiple first, second, third, and fourth values during a period a rotor pole of the motor traverses a rotor pole pitch angle; and
    identifying the position of the rotor relative to a stator of the motor, based on information obtained from the multiple first, second, third, and fourth values.

14. The method of claim 1, further comprising:
    obtaining multiple first, second, third, and fourth values during a period a rotor pole of the motor traverses a rotor pole pitch angle; and
    identifying a position of the rotor pole relative to a stator of the motor, based on the multiple first, second, third, and fourth values.

* * * * *